US009964261B2

(12) United States Patent
Ying et al.

(10) Patent No.: US 9,964,261 B2
(45) Date of Patent: May 8, 2018

(54) INTEGRATED LIGHTING FIXTURE AND MESSAGE BOARD

(71) Applicants: Jeffrey Ying, Glendora, CA (US); Jerry Lin, Rowland Heights, CA (US); Yongchang Wang, Diamond Bar, CA (US)

(72) Inventors: Jeffrey Ying, Glendora, CA (US); Jerry Lin, Rowland Heights, CA (US); Yongchang Wang, Diamond Bar, CA (US)

(73) Assignee: I/O Controls Corporation, Azusa, CA (US)

( * ) Notice: Subject to any disclaimer, the term of this patent is extended or adjusted under 35 U.S.C. 154(b) by 0 days. days.

(21) Appl. No.: 14/206,161

(22) Filed: Mar. 12, 2014

(65) Prior Publication Data

US 2014/0267975 A1   Sep. 18, 2014

Related U.S. Application Data

(60) Provisional application No. 61/802,274, filed on Mar. 15, 2013.

(51) Int. Cl.
| | |
|---|---|
| *B60Q 3/60* | (2017.01) |
| *F21K 9/60* | (2016.01) |
| *G09F 9/33* | (2006.01) |
| *G09F 21/04* | (2006.01) |
| *B60Q 3/51* | (2017.01) |
| *B60Q 3/43* | (2017.01) |
| *B60Q 3/47* | (2017.01) |
| *G02F 1/1335* | (2006.01) |

(Continued)

(52) U.S. Cl.
CPC ............. *F21K 9/60* (2016.08); *B60Q 3/43* (2017.02); *B60Q 3/47* (2017.02); *B60Q 3/51* (2017.02); *G09F 9/33* (2013.01); *G09F 21/04* (2013.01); *B60Q 1/503* (2013.01); *G02F 2001/133618* (2013.01); *H04N 21/41422* (2013.01)

(58) Field of Classification Search
CPC .... B60Q 3/025; B60Q 3/0259; B60Q 3/0206; B60Q 3/0279; B60Q 3/0289; B60Q 2500/10; F21K 9/54; F21K 9/30; G02F 1/133603; G02F 1/133331; H04N 21/41422; G09F 21/048
USPC .......................................................... 362/612
See application file for complete search history.

(56) References Cited

U.S. PATENT DOCUMENTS

| | | | |
|---|---|---|---|
| 2004/0129197 A1* | 7/2004 | Nakagawa et al. | 116/28 R |
| 2009/0237950 A1* | 9/2009 | Ying | B60Q 3/005 362/479 |

(Continued)

*Primary Examiner* — Nathanael R Briggs
(74) *Attorney, Agent, or Firm* — Irell and Manella, LLP

(57) ABSTRACT

A message board lighting fixture has semiconductor based lighting elements for illumination and an integrated electronic message board display for displaying content to occupants of a transit vehicle or other area. The lighting fixture may include a concave fixture frame having a reflective interior, with lighting elements positioned along the length of the frame to provide area illumination. The electronic display may be mounted on a projecting frame substantially centrally within the cavity of the concave fixture frame, and may be augmented with additional semiconductor based lighting elements for backlighting. A detachable lens cover may have a diffusive portion and a separate transparent region over the electronic display area.

25 Claims, 22 Drawing Sheets

(51) Int. Cl.
*H04N 21/414* (2011.01)
*B60Q 1/50* (2006.01)

(56) References Cited

U.S. PATENT DOCUMENTS

| | | | |
|---|---|---|---|
| 2011/0194047 A1* | 8/2011 | Bruyneel | G02F 1/133603 349/61 |
| 2011/0225859 A1* | 9/2011 | Safavi | G02F 1/133308 40/448 |
| 2012/0051062 A1* | 3/2012 | Miridonov | F21S 8/086 362/297 |

* cited by examiner

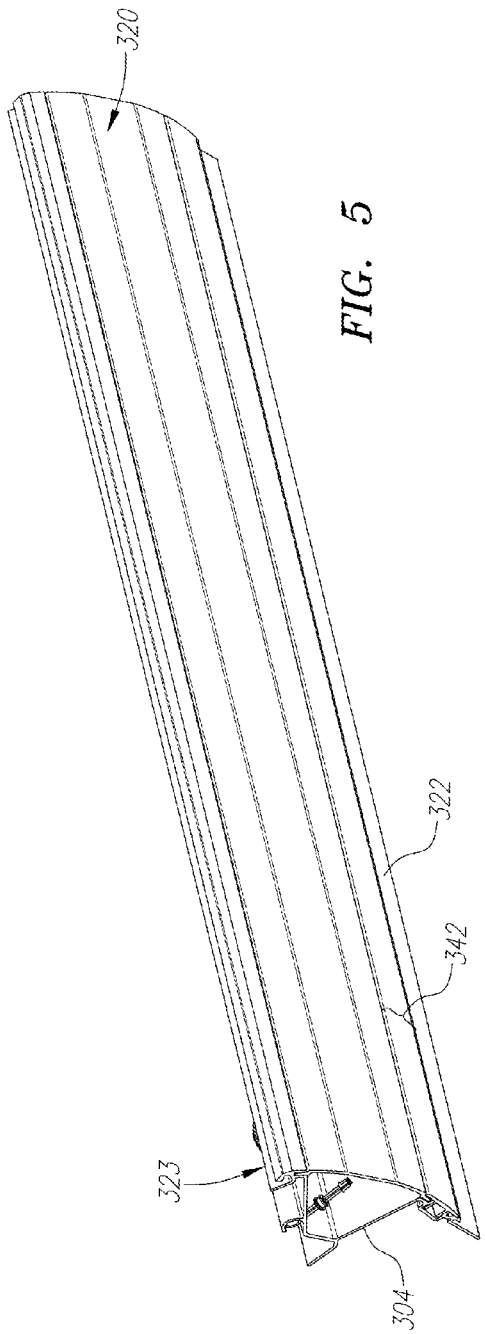
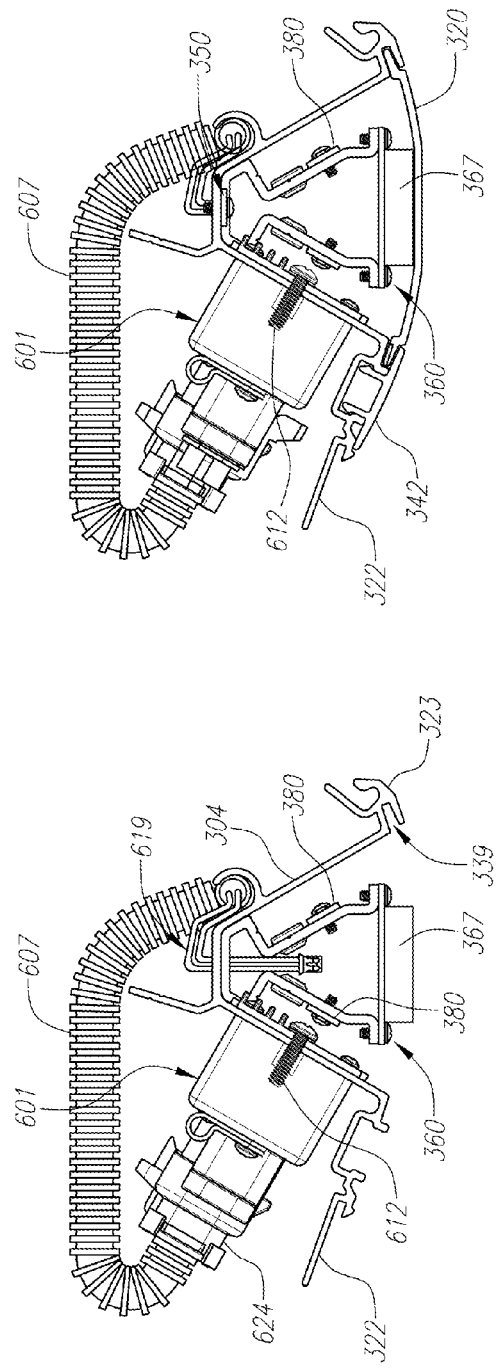

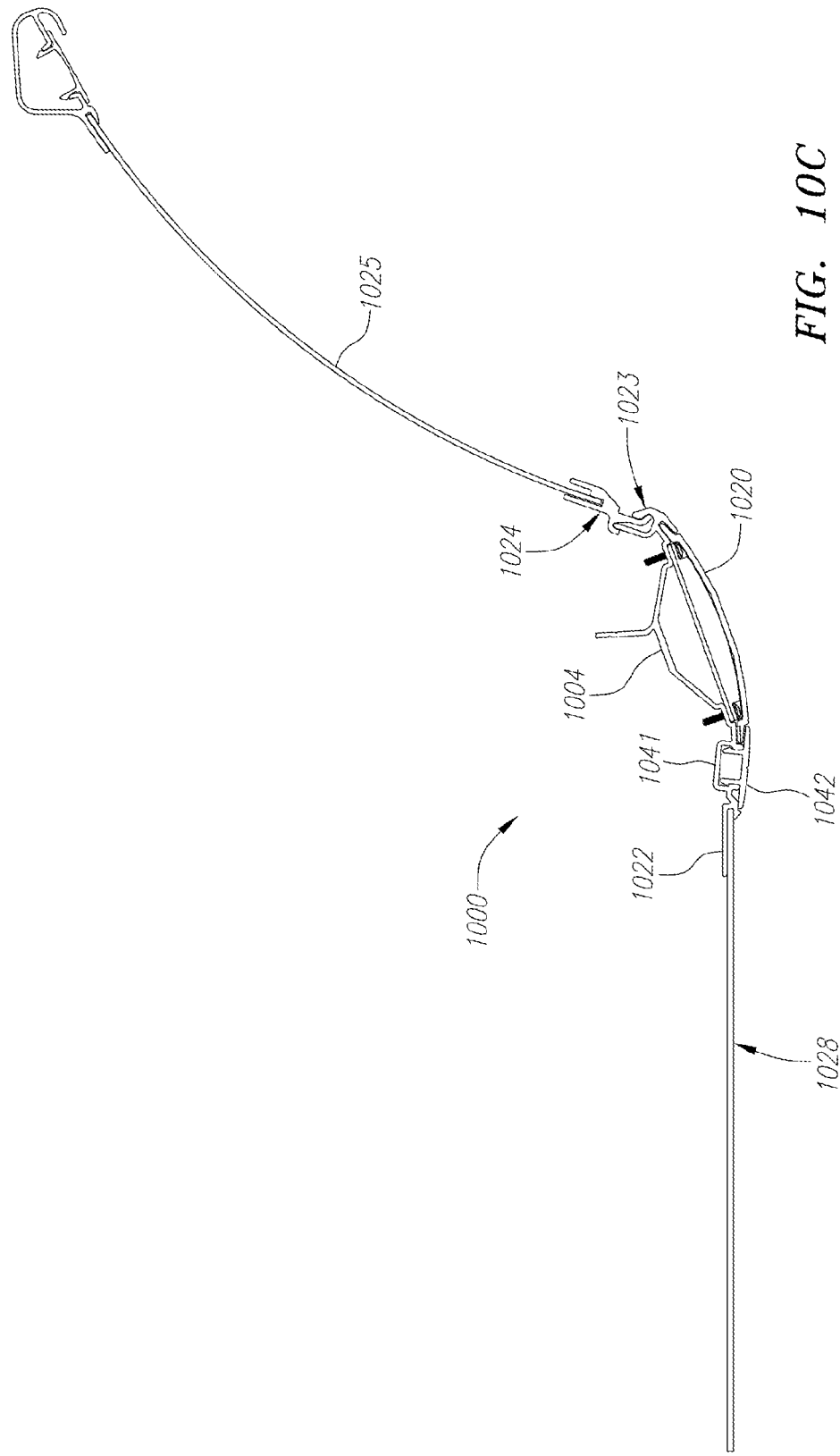

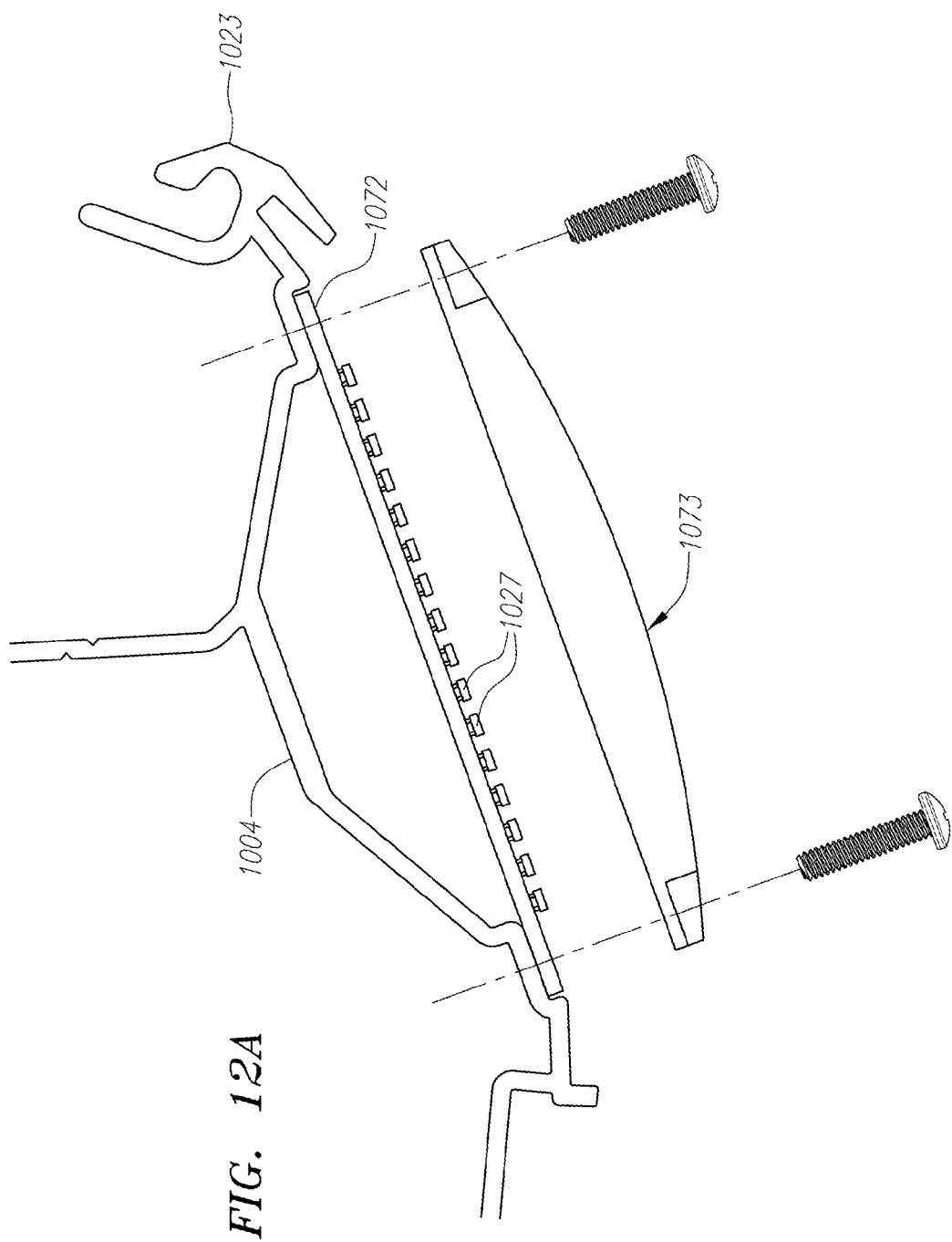

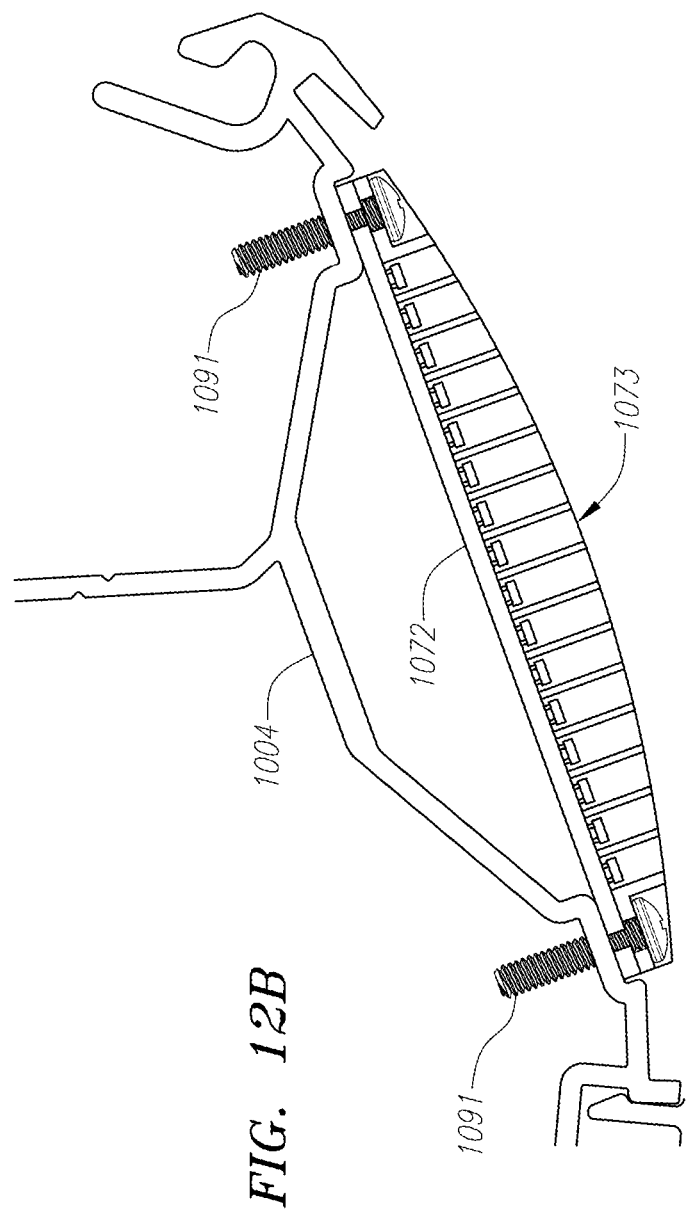

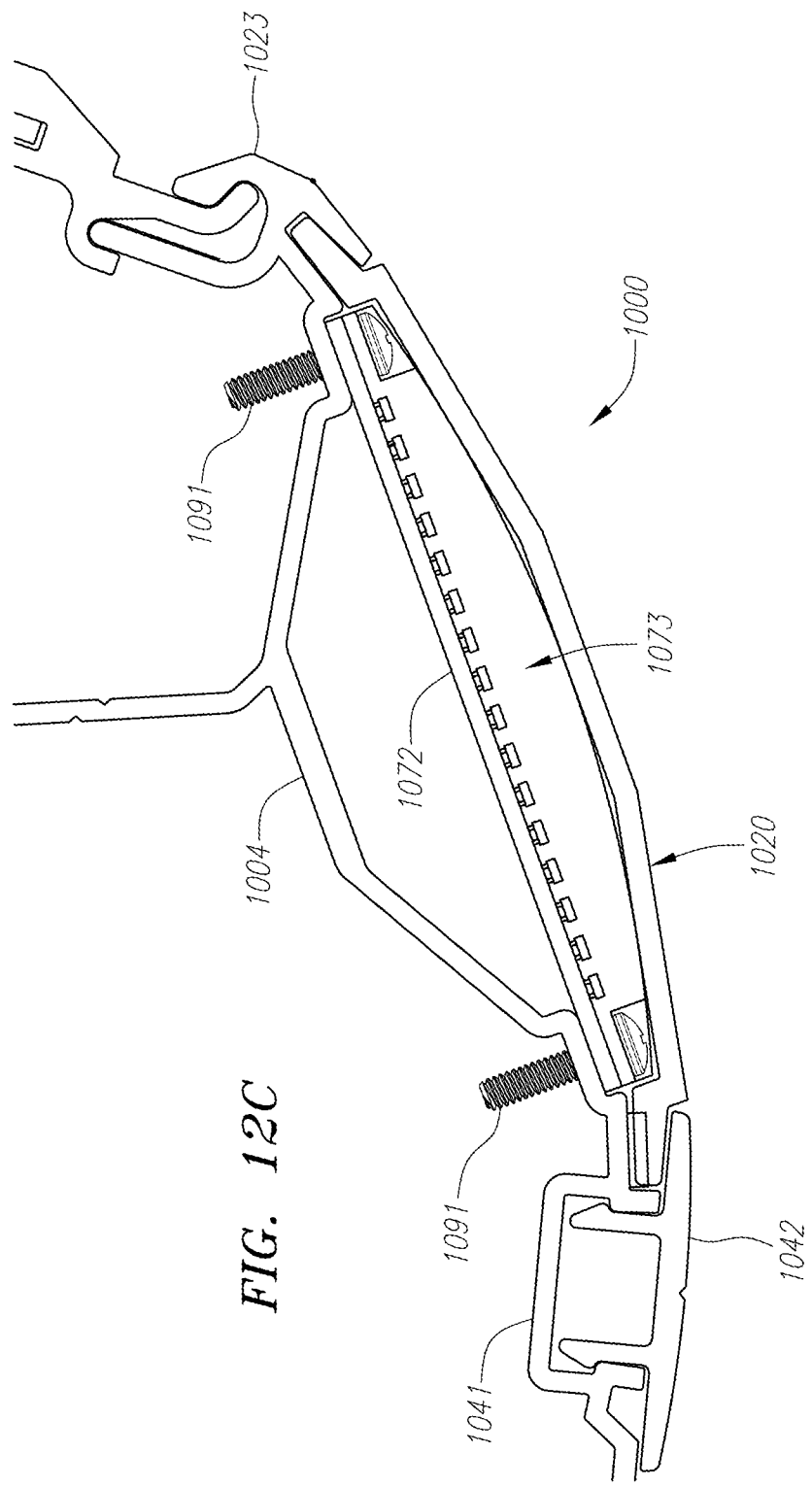

INTEGRATED LIGHTING FIXTURE AND MESSAGE BOARD

RELATED APPLICATION INFORMATION

This application claims the benefit of U.S. Provisional Application Ser. No. 61/802,274, filed on Mar. 15, 2013, hereby incorporated by reference as if set forth fully herein.

BACKGROUND OF THE INVENTION

1) Field of the Invention

The field of the present invention generally relates to lighting systems and, more particularly, to lighting systems used in transit vehicles or conveyances such as buses, lightrail cars, and the like.

2) Background

Transit vehicles and similar conveyances have historically relied upon fluorescent lighting to provide illumination, in part because of the efficiency of such lighting as compared to, for example, incandescent lighting. However, fluorescent lighting has drawbacks and limitations.

For example, fluorescent lighting has a relatively short lifetime and a high current draw as compared to some other types of lighting The nature of fluorescent lights leads to high electro-magnetic fields, making compatibility with other electrical equipment challenging. Fluorescent lights also often have problems with arcing, which in turn can pose fire dangers or else blow out electrical components and/or cause power ripples. In addition, fluorescent lighting is not very amenable to flexible control, and can be difficult to dim.

Recently, efforts have been made to incorporate light-emitting diode (LED) based lighting within transit vehicles. For example, U.S. Pat. No. 8,400,061, entitled "Control Network for LED-Based Lighting System in a Transit Vehicle" and assigned to the assignee of the present invention, describes a novel transit vehicle lighting system with a plurality of LED-based lighting fixtures for providing interior illumination.

As another interior feature, some transit vehicles or conveyances include a means for displaying information or advertisements to passengers. This may take the form of printed ads mounted to the walls of the transit vehicle, or else may involve electronic displays that can be used to provide information about destinations, advertisements, and the like. Such displays may take the form of an LED matrix for displaying text or simple images or icons, or else may use a liquid crystal display (LCD) to show more detailed moving images in the nature of video.

While message displays or printed advertisements may be useful, there may be insufficient room within the transit vehicle to mount the advertisements or the display mechanism. Providing wall space for these purposes takes away other uses of that space, and for example may limit the size of windows in the transit vehicle. Similarly, lack of adequate interior wall space may result in the message display or advertisements being place in a location within the vehicle that is difficult for passengers to view. In addition, LCD-based displays, while having the advantage of being able to show video, can be expensive and generally require expensive audio-visual electronic components to provide the video (and audio) feeds and store the video information.

It would therefore be advantageous to provide both a means for lighting the interior of a transit vehicle or conveyance and a means for displaying information or advertisements to passengers or others, which overcomes one or more of the disadvantages or limitations of conventional lighting systems, printed advertisements, and/or electronic displays. It would further be advantageous to provide such a means or system which makes efficient use of the interior space of a transit vehicle, and which is generally inexpensive or not overly complex to implement or deploy, and/or has other benefits and advantages not found in the state of the art.

SUMMARY OF THE INVENTION

The invention is generally directed in one aspect to a novel lighting fixture that is particularly well suited for a transit vehicle or similar conveyance, but which may find other uses or applications as well, such as for example the interior of room requiring illumination.

According to one embodiment as disclosed herein, a message board lighting fixture for a transit vehicle comprises a plurality of semiconductor based lighting elements (such as LEDs) for illuminating an area of a transit vehicle or other interior area, and an integrated electronic display that may allow information, messages, advertisements, or other content to be displayed to occupants of the vehicle or area.

In a particular embodiment, a lighting fixture includes a concave fixture frame having a reflective interior, with semiconductor based lighting elements (such as LEDs) positioned along the frame to provide area illumination. An electronic display is mounted to or otherwise integrated with the fixture frame, so that the display is visible when the lighting fixture is mounted in position in the transit vehicle or elsewhere. The electronic display may be mounted substantially centrally within the cavity of the concave fixture frame, and may be augmented with additional semiconductor based lighting elements that additional provide illumination surrounding the electronic display. A detachable lens cover, which may be diffusive in nature or else include a transparent region in the location of the electronic display area, may be attach to the fixture frame so as to enclose the electronic display within the cavity of the fixture frame. The lighting fixture may provide both area illumination as well as the ability to display messages or information on the electronic display thereof.

In various forms and embodiments, the lighting fixture may be part of a lighting control network in which a plurality of lighting fixtures each comprise a plurality of semiconductor based lighting elements (e.g., LEDs) for illuminating an area along with a slave node at each fixture for controlling the lighting fixture, and a master node in communication with the slave nodes. A digital communications bus may be provided for communicating among the master node and the slave nodes. The digital communications bus may be combined with a power supply cable, and the master node may be connected to the slave nodes by wiring in a daisy chain fashion from fixture to fixture.

In certain embodiments, the electronic display may take the form of an LED matrix or two-dimensional LED array. Alternatively, the electronic display may take other forms, such as a binary-coded decimal (BCD) lighting array.

In one or more embodiments, a combined lighting fixture and message board includes an array of semiconductor lighting elements (such as LEDs) arranged, for example, in a two-dimensional matrix. The LEDs may be used both for purposes of illumination and for generating text, messages, or other information that is viewable by passengers (if a vehicle) or occupants of the area. The combined lighting fixture may have different modes, for example a daytime mode and nighttime mode, with different operation depending upon the time of day or the ambient lighting conditions.

Further embodiments, variations and enhancements are also disclosed herein.

BRIEF DESCRIPTION OF THE DRAWINGS

FIG. 4A is an oblique view diagram of a back portion of a message board component of the integrated lighting fixture depicted in FIG. 3, while

FIG. 5 is a diagram of the message board lighting fixture of FIG. 3, with a lens cover shown in place.

FIGS. 6A and 6B are side view diagrams of the message board lighting fixture of FIG. 3, with FIG. 6B showing the lighting fixture with a lens cover.

FIG. 10C is a side view diagram of the same message board lighting fixture.

FIGS. 12A, 12B and 12C are side view diagrams illustrating certain components that may be used in the message board lighting fixture of FIGS. 10A-10C and/or in the embodiment illustrated in FIGS. 11A and 11B.

FIGS. 13A and 13B are side view diagrams illustrating another embodiment of a message board and lighting fixture as disclosed herein, while

DETAILED DESCRIPTION OF PREFERRED EMBODIMENT(S)

According to various embodiments as disclosed herein, a message board lighting fixture for a transit vehicle comprises light elements, preferably in the form of semiconductor based lighting elements such as LEDs, for illuminating an area of a transit vehicle or other interior area, and an integrated electronic display that allows information, messages, advertisements, or other content to be displayed to occupants of the vehicle or area. In certain embodiments, the lighting fixture may include one or more of the following features: (i) a concave fixture frame having a reflective interior, (ii) semiconductor based lighting elements (such as LEDs) positioned along a fixture frame to provide area illumination; (iii) an electronic message board display mounted to or otherwise integrated with the fixture frame, so that the display is visible when the lighting fixture is mounted in position in the transit vehicle or elsewhere; (iv) additional lighting elements (such as LEDs) for providing local illumination or backlighting surrounding the electronic display; and/or (v) a detachable lens cover, which may be diffusive in nature or else include a transparent region in the location of the electronic display area, enclosing the electronic display within the cavity of the fixture frame. The lighting fixture may provide both area illumination as well as the ability to display messages or information on the electronic display thereof.

In various embodiments, the message board display may take the form of a matrix LED display or a binary coded decimal (BCD) LED array. The lighting fixture may be part of a lighting control network in which a plurality of lighting fixtures each comprise one or more semiconductor based lighting elements (e.g., LEDs) for illuminating an area along with a slave node at each fixture for controlling the lighting fixture, and a master node in communication with and controlling the slave nodes. A digital communications bus may be provided for communicating among the master node and the slave nodes. The master node may also control the message board display through a separate bus or communication path, or else the lighting fixture's slave node may control the message board display, for example.

In other embodiments, a message board lighting fixture may include an array of LEDs or other lighting elements arranged, for example, in a two-dimensional matrix, that are used both for illumination and as a message board. The message board lighting fixture may have different modes, for example a daytime (or standard) mode in which messages and images are generated by selective illumination of LEDs or lighting elements, and a nighttime (or reverse) mode in which messages and images are generated by selective de-illumination of LEDs or lighting elements. Selection of the mode may be based on time of day as indicated by a system clock, or else by ambient lighting conditions which may be detected by an optical sensor or determined by other means.

Figure 1:
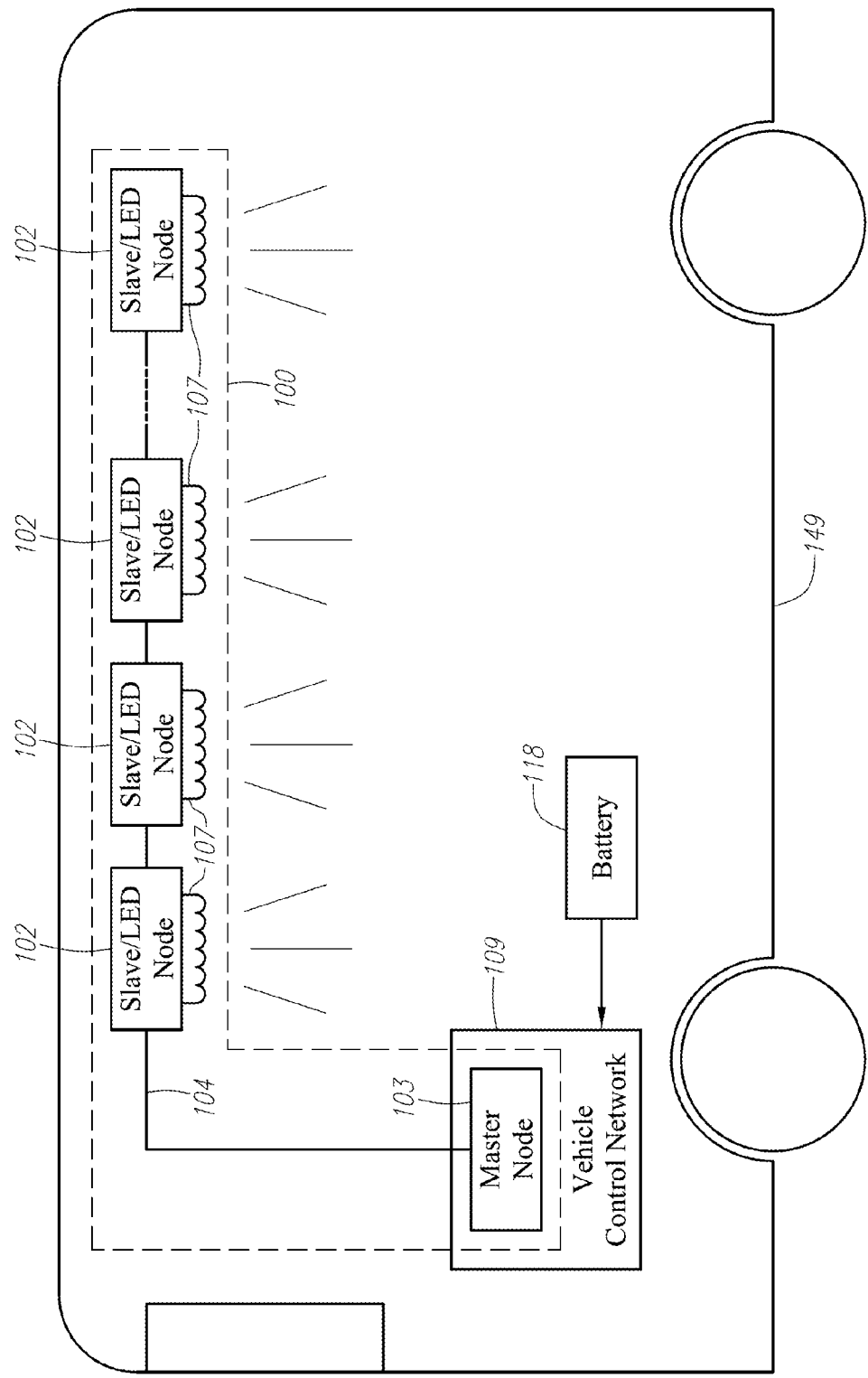
FIG. 1 is a diagram showing an example of a lighting control system for a transit vehicle in accordance with one embodiment as disclosed herein.

FIG. 1 is a conceptual diagram of an example of a lighting control system as may be used in connection with a transit vehicle that may include lighting fixtures including one or more message board lighting fixtures. In FIG. 1, the lighting control system 100 comprises part of, or interacts with, a vehicle control network 109 that controls various functions and operations of a transit vehicle 149. The vehicle control network 109, through various network nodes or other components, may control or monitor aspects of the transit vehicle's operational features such as, e.g., its transmission system, engine sensors or controls, control switches, instrument panel, internal lighting system, and so on. In one aspect, the lighting control system 100 may comprise a sub-system of the vehicle control network 109, although in other embodiments the lighting control system 100 may be standalone or independent of the main vehicle control network 109.

As further illustrated in FIG. 1, power may be provided to the vehicle control network 109 and/or lighting control network 100 via an on-board battery 118, which typically will be rated 24 Volts for a transit vehicle although other battery sizes or power sources may be used, and in any event the actual voltage output may vary over time and under various conditions. The lighting control network 100 in this example comprises a plurality of network nodes including a master node 103 and a series of slave/LED nodes 102, each of which constitutes or is associated with an LED-based lighting fixture having local electronic control but responsive to the master node 103. A power/data bus 104 preferably interconnects the series of slave/LED nodes 102 in a daisy-chain fashion. Each of the slave/LED nodes 102 may include a plurality of LEDs 107 arranged on a lighting panel or other fixture to provide illumination for a particular interior region of the transit vehicle 149. One of more of the slave/LED nodes 102 may control or take the form of a message board lighting fixture according to any of the embodiments disclosed later herein.

Figure 2:
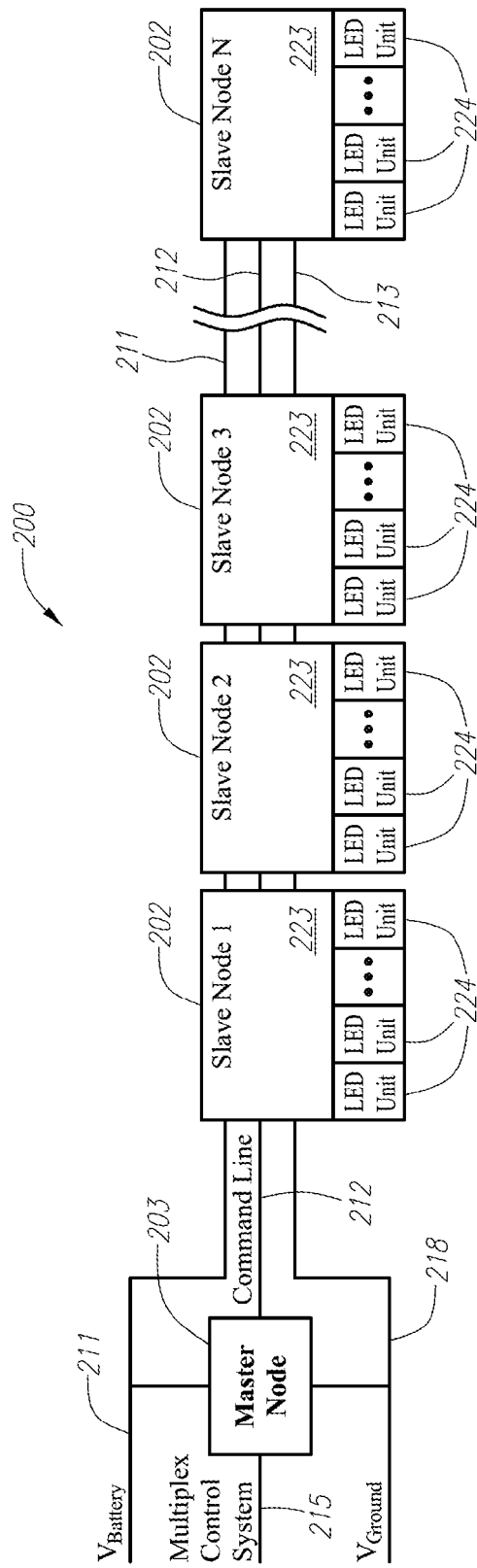
FIG. 2 is a high level architectural diagram of an embodiment of a lighting control system having a series of light fixtures, including a combined or integrated lighting fixture and message board, as may be used, for example, in a transit vehicle or other environments.

FIG. 2 is a high level architectural diagram of an embodiment of a lighting control system 200 as may be used in the transit vehicle of FIG. 1 or in other settings. As illustrated in FIG. 2, the lighting control system 200 comprises a master node 203 and a series of LED-based lighting fixtures 202, each of which constitutes or is associated with a slave/LED network node having local control electronics responsive to the master node 203, similar to the lighting control system 100 of FIG. 1. Each of the LED-based lighting fixtures 202 in this example comprises a network (slave) node 223 and one or more LED units 224, and may further include a message board feature as described in various embodiments elsewhere herein. Each LED unit 224 comprises one or more LEDs arranged thereon to provide illumination for a particular interior region of a transit vehicle. The LED units 224 may each comprise a plurality of LEDs for illumination of the interior of a transit vehicle. The LED-based lighting fixtures 202 may, for example, be physically installed along the ceiling region above the seating area of a transit vehicle, thereby providing continuous illumination for occupants in the interior of the transit vehicle. One of more of the LED-based lighting fixtures 202 may take the form of a message board lighting fixture according to any of the embodiments disclosed later herein.

In one or more embodiments, the LED-based lighting fixtures 202 (including one or more that may be integrated with or include a message board in various embodiments disclosed herein) are interconnected in series, in a daisy-chain manner, as described with respect to FIG. 1. A power bus comprising a power supply line 211 from the vehicle battery and a ground line 213 is preferably connected from the master node 203 to each LED-based lighting fixture 202 and slave node 223 thereof, in series. Likewise, a command/data bus 212 may be connected from the master node 203 to each LED-based lighting fixture 202 and slave node 223 thereof, in series. Although other techniques may be used, by connecting the LED-based lighting fixtures in daisy-chain fashion, wiring of the interior lights for the transit vehicle may be simplified.

In operation, the master node 203 may communicate with the main vehicle control network (e.g., control network 109 in the example of FIG. 1) and may respond to commands or queries therefrom, and/or may send alarm signals, interrupts, or status information to the main vehicle control network.

The master node 203 may also control the various LED-based lighting fixtures 202, and slave nodes 223 thereof, through commands or queries transmitted over the command/data bus 212. The command/data bus 212 may be embodied as any suitable bus, and may, for example, be serial or parallel in nature, and may be electrical or optical in nature (e.g., using fiber optics). The master node 203 and slave nodes 223 may be arranged in a linear configuration, or else may be arranged in a loop configuration as explained hereinafter for increased reliability and redundancy. Commands or inquiries may be transmitted from the master node 203 over the command/data bus 212 to the first slave node 223 (Slave Node 1), which then propagates the commands or inquiries over the command/data bus 212 to the next slave node 223 (Slave Node 2) in the chain, and so on in sequence until the command or inquiry reaches the last slave node 223 (Slave Node N) if necessary. Commands or inquiries need not be propagated if the targeted slave node 223 receives the command or inquiry and responds thereto; however, it may nonetheless be desirable in some configurations to propagate all commands and inquiries, or certain subsets thereof, to all of the slave nodes 223 in the lighting control network 200.

Via commands or inquiries conveyed over the command/data bus 212, the master node 203 may control, individually or by group, the individual LED units 224 of each LED-based lighting fixture 202. The master node 203 may, for example, command certain LED units 224 to turn on, turn off, dim by a specified amount, intensify by a specified amount, flash (e.g., in emergency situations), activate according to a predetermined pattern, or enter a particular mode (such as a daytime mode or nighttime mode). Dimming may be accomplished by pulse width modulation, thereby reducing the percentage of time that the LEDs are turned on, and/or by turning off selected LEDs and thereby reducing the number of "on" LEDs at a given time. Likewise, the intensity of light may be increased by increasing the percentage of time that the LEDs are turned on using pulse width modulation, and/or by turning on additional selected LEDs which are initially in an "off" state. The master node 203 may convey commands to the slave nodes 223 at each LED-based lighting fixture 202, and, in response thereto, the slave nodes 223 may be responsible for locally controlling the electronics at each LED-based lighting fixture 202 in order to implement the command received from the master node 203.

As described in more detail hereafter, via commands conveyed over the command/data bus 212 or an alternative data path, the master node 203 may also control a lighted message board that may be integrated or included with any of the LED-based lighting fixtures 202, according to the various embodiments disclosed herein. For example, the master node 203 may command the message board to display certain text or images (including video), and/or may command a local message board controller to display such text or images. The text, image, video or other content for the message board may be stored locally to the master node, with a local message board controller, at a remote storage location in the vehicle associated with the control network, and/or may be received wirelessly, either in real time or downloaded wirelessly and stored for future use.

According to certain embodiments as described herein, the message board lighting fixture may be integrated with audio speakers, and the video and/or text may be supplemented with audio content. For example, video and audio may be presented in the form of MPEG or other compressed formats, where the message board is capable of displaying such content.

Figure 3:
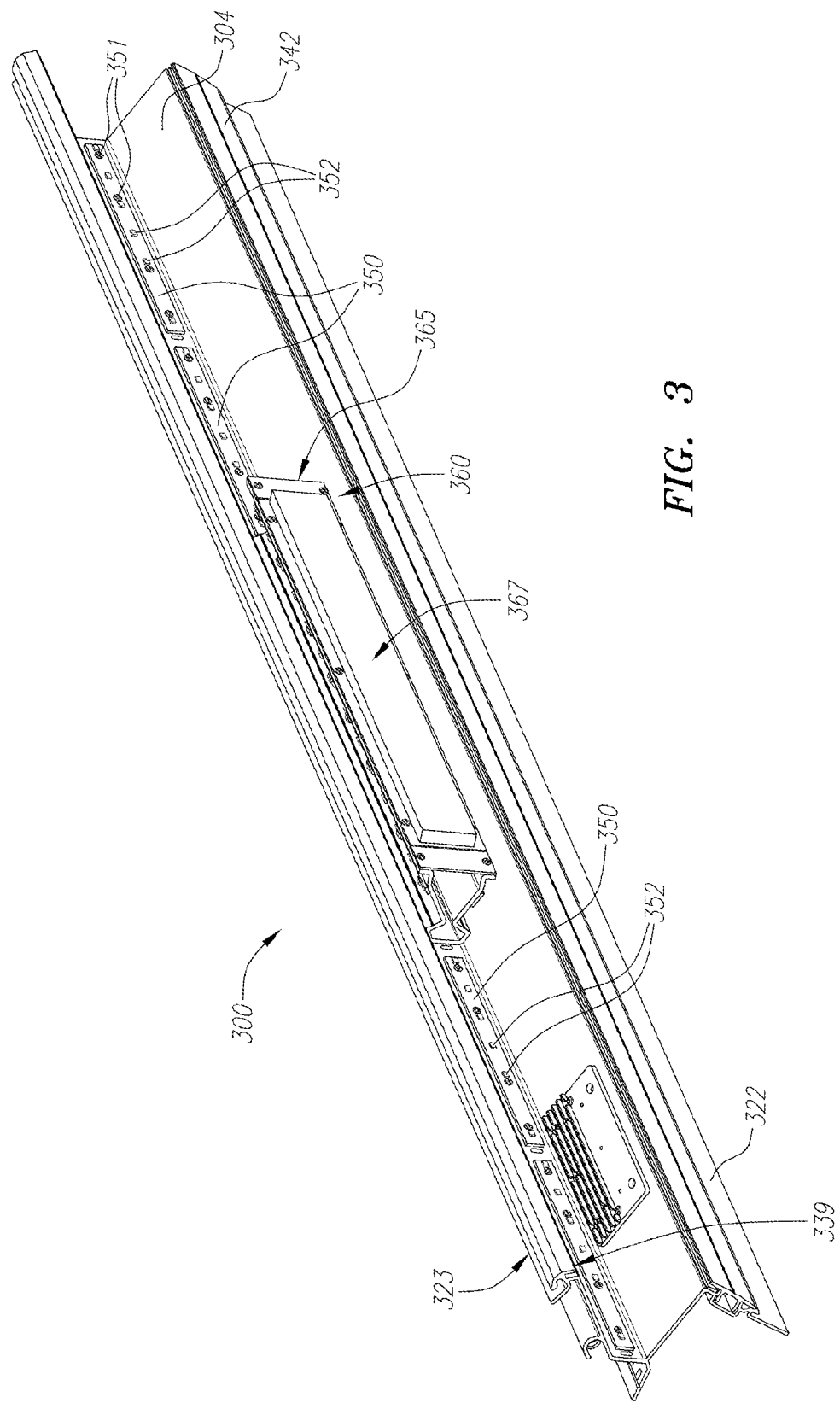
FIG. 3 is an oblique view diagram of portions of a message board lighting fixture in accordance with one embodiment as disclosed herein, as may be used, for example, in the lighting control system depicted in FIG. 2 or otherwise.

FIG. 3 is a diagram illustrating portions of a message board lighting fixture 300 in accordance with one embodiment as disclosed herein, as may be used, for example, in the lighting system depicted in FIG. 1 or 2, or otherwise. The message board lighting fixture 300 in the example of FIG. 3 includes both semiconductor light elements 352 for providing area illumination, as well as an integrated message board 360 that may be used to visibly display text, information, or other graphics to nearby occupants.

The message board lighting fixture 300 in this embodiment includes a fixture frame 304 on which are disposed various LED units (or "light bars") 350 and a message board 360. The LED units 350 in this example each have a linear array of lighting elements such as light emitting diodes (LEDs) 352, although other arrangements of lighting elements may be utilized. The LED units 350 may be attached to the LED frame 304 by screws 351 or other fastening mechanisms. The length of the LED frame 304 of the message board panel fixture 300 may vary depending upon lighting needs, and may for example be approximately 60" in length. The number of LED units 350 may be selected to provide sufficient illumination for the interior of a transit vehicle or other compartment, and in this example there are four LED units 350, two disposed on either side of the message board unit 360. Each LED unit 350 in this example has five LEDs 352, preferably arranged in a linear array and electrically connected in series through conductors or wires (not shown), although the number of LEDs will depend at least in part on the wattage or candlepower of the LEDs selected, as well as the amount of illumination required. The LEDs 352 may be mounted on a metal printed circuit board (PCB) for convenient modular attachment and/or to help dissipate heat. The number of LEDs may, if desired, be different on different LED units 350 or else may be the same.

Advantageously, the LED units 350 may be mounted at the base of the V-shaped cavity of the fixture frame 304, so that the light emanating from the LEDs 352 may have sufficient room to spread before reaching the light permeable cover 320 (see FIG. 5) that is placed at the outer edge of the fixture frame 304. The structure of the fixture frame 304 and the mounting location of the LED units 350 thereby facilities a broader, more continuous and ambient lighting effect, particularly when combined with the effect of the light permeable cover 320.

The message board lighting fixture 300 may have a control module to drive the LEDs 352 or other lighting elements of the various LED units 350, as described previously with respect to FIG. 2. The control module may be contained in a control module housing (not shown in FIG. 3) on the back of the fixture frame 304, as described in more detail elsewhere herein.

As more clearly shown in the separate and distinct embodiment illustrated in FIGS. 10A-10C, described later, the message board lighting fixture 300 preferably includes a lengthwise attachment member 323 which may include a slot for receiving a vehicle riser panel (not shown in FIG. 3) which forms part of the upper ceiling/wall of the transit vehicle. The message board lighting fixture 300 preferably is designed to connect to an upper seat compartment ceiling panel (not shown in FIG. 3) via an extension member 322 that terminates in a U-shaped slot for receiving the ceiling panel. In addition to a slot for receiving a riser panel, the lengthwise attachment member 323 may also have a second slot 339 for receiving a detachable light permeable cover 320 (see FIG. 6B), with a removable snap-in lens holder 342 being snapped into a matching receptacle to pin or hold the light permeable cover 320 into place. The light permeable cover 320 may be diffusive over the LED units 350, where area illumination is intended, and along the peripheries of the message board lighting fixture 300, while having a separate transparent portion (like a clear window or lens) over the message board lighting fixture 300 to provide an unobstructed and unimpeded view thereof.

Figure 4A:
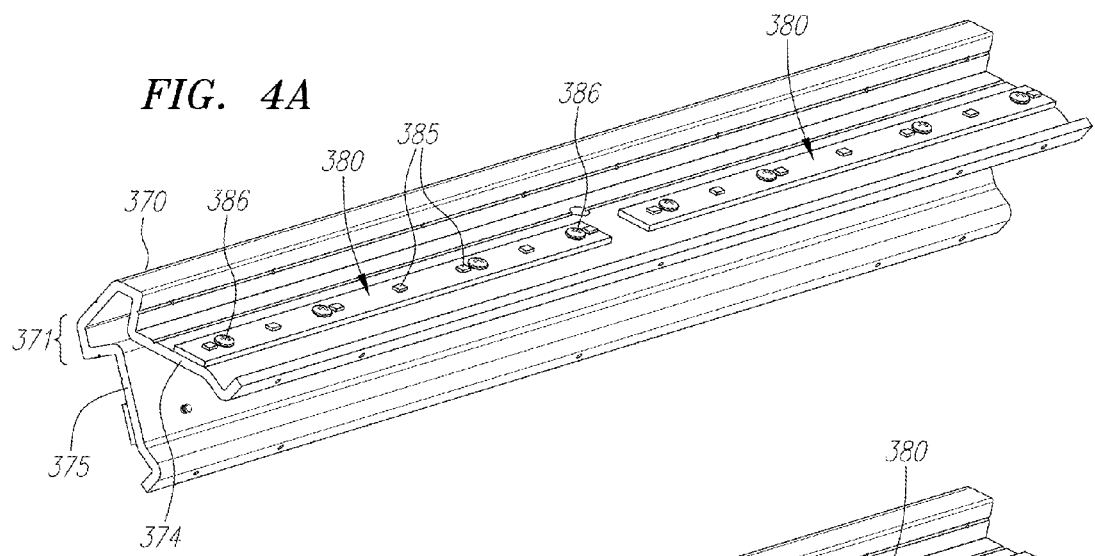
Figure 4B:
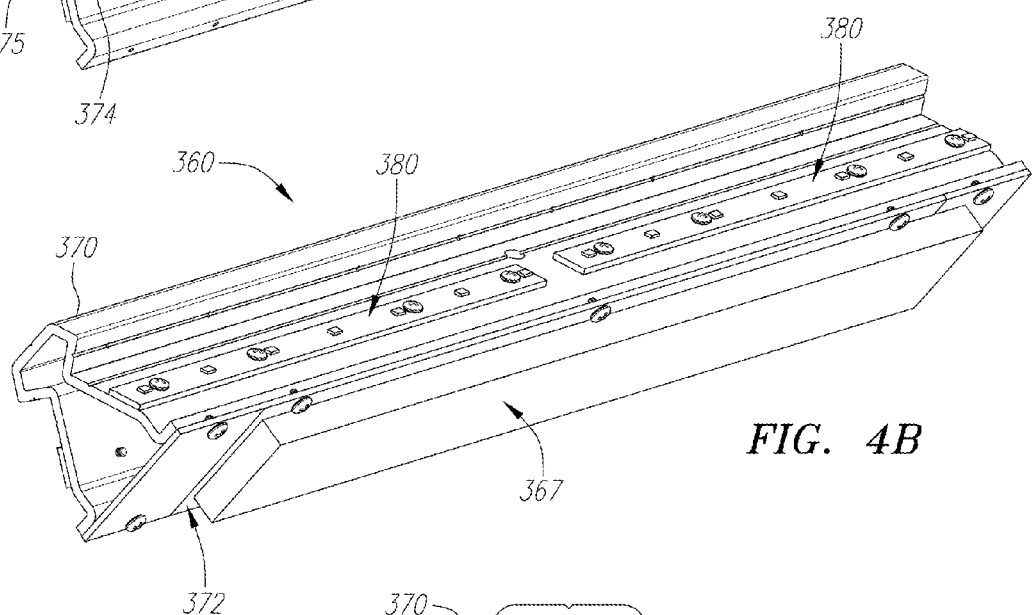
FIGS. 4B and 4C are diagrams of the message board from an oblique view and side view, respectively.
Figure 4C:
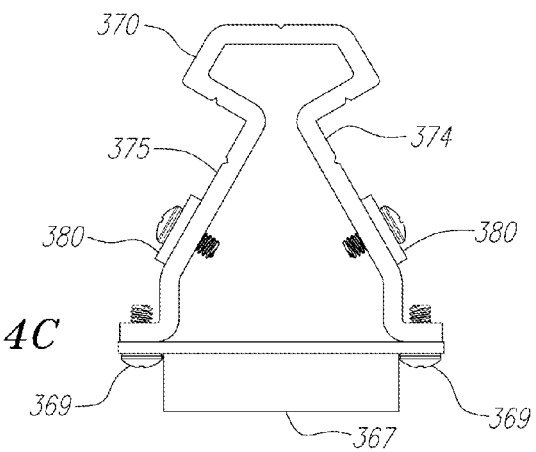

Further details of the message board unit 360 and its various components according to the exemplary embodiment are illustrated in FIGS. 4A-4C. FIG. 4A is an oblique view diagram of a back portion of a message board component of the integrated lighting fixture depicted in FIG. 3, while FIGS. 4B and 4C are diagrams of the message board from an oblique view and side view, respectively. As shown in FIG. 4A, the message board unit 360 includes a message board support frame 370 that, in this example, is formed with a relatively narrow base section 371 with two frame sidewalls 374, 375 that gradually taper outwards. The base section 371 of the message board support frame 370 may be securely attached to the message board lighting fixture 300, as illustrated in FIG. 3, while at the other end of the sidewalls 374, 375 a message board display unit 367 may be mounted atop a panel member 372 disposed on the message board back frame 370, as illustrated in FIG. 4B. The message board support frame 370 and panel member 372 may thereby constitute a message board frame for the message board display unit 367. The penal member 372 may be attached to the message board support frame 370 by any convenient means, such as for example by screws 369 as illustrated in FIG. 4C.

The message board frame may advantageously be outfitted with additional lighting elements, thereby providing, for example, more even lighting for the message board lighting fixture 300 or supplemental lighting therefore. In the example of FIGS. 4A-4C, on the outer sides of frame sidewalls 374 and 375 are disposed various additional lighting elements, in this case LED units 380 (or "light bars") each similar to the LED units 350 disposed in the cavity of the message board lighting fixture 300 illustrated in FIG. 3. Thus, the LED units 380 may each have a number of LEDs 385 disposed thereon in a linear array, and may further include conductors or wires (not shown) preferably electrically connecting the LEDs 385 in series. The LEDs 385 may be mounted on a metal printed circuit board (PCB) for convenient modular attachment and/or to help dissipate heat. The LED units 380 may be attached to the frame sidewalls 374, 375 by any convenient means, such as screws 386 as illustrated in FIG. 4A.

Further details of a preferred message board lighting fixture in accordance with the embodiment of FIG. 3 are shown in FIGS. 5, 6A and 6B. FIG. 5 is an oblique view diagram of the message board lighting fixture 300 of FIG. 3, showing the detachable light permeable cover 320 in place. As noted earlier, the lengthwise attachment member 323 has a slot 339 (see FIG. 6A) for receiving the detachable light permeable cover 320, as illustrated in FIG. 6B, with a removable snap-in lens holder 342 placed into a complementary receptacle to pin or hold the light permeable cover 320 into place. The light permeable cover 320 is preferably partially diffusive in nature so as to blend the light from the various LEDs and provide the illusion of a continuous light source as opposed to individual point light sources, thus leading to a more attractive illumination ambience. As noted previously, the light permeable cover 320 may also have a clear window to facilitate unimpeded viewing of the message board lighting fixture 300.

FIGS. 6A and 6B are side view diagrams of the message board lighting fixture 300 of FIG. 3, with FIG. 6A showing the message board lighting fixture 300 without the light permeable cover and FIG. 6B showing it with the light permeable lens cover 320 in position, pinned into place by removable snap-in lens holder 342. FIGS. 6A and 6B also show how the message board unit 360 may be mounted within the cavity of the fixture frame 304 and electronically controlled. In this example, the base section 371 (see FIG. 4A) of the message board unit 360 is designed to fit snugly at the base of the V-shaped cavity of the fixture frame 304, where it attaches securely to the fixture frame 304. The base section 371 forms almost a closed shape, so that frame sidewalls 374, 375 create a gap between themselves and the sidewalls of the V-shaped channel of fixture frame 304. The LED units 380 on the frame sidewalls 374, 375 of the message board unit 360 output light from the LEDs towards the interior cavity walls of fixture frame 304, which are preferably reflective so that the LED light may be reflected and scattered towards the light permeable cover 320. The LED units 380 may therefore advantageously provide an aura of illumination surrounding the message board unit 360 and avoid shadowing that may otherwise potentially be created around the message board unit 360.

The message board unit 360 may be placed anywhere along the length of the message board lighting fixture 300. Returning to FIG. 3, for example, the message board unit 360 may be generally centrally located with respect to the lengthwise dimension of the message board lighting fixture 300. The LED units 350 to either side of the message board unit 360 provide area illumination for, e.g., a seating compartment within a transit vehicle. The LED units 380 on the outside of the message board unit (see FIG. 4C) may provide supplemental area illumination, so that the overall area illumination of the message board lighting fixture 300 does not suffer, and also may avoid shadowing or dark areas in the proximity of the message board unit 360. The LED units 380 of the message board unit 360 may be selectively operable when the message display of the message board unit 360 is inactive, and also may be selectively operable when the message display is activated.

Returning again to FIGS. 6A and 6B, various feature relating to electrical control of the message board unit 360 are illustrated. A control unit housing 601 may encapsulate the controller electronics (processor, memory, registers, etc.) used to control and activate the message board display of the message board unit 360. The control unit housing 601 may be securely attached to an outer wall of the fixture frame 304 by any convenient means, such as one or more screws 612. A flexible conduit 607 may be attached to a connector 624 of the control unit housing 601, and may be routed so as to connect at the other end to an opening or connector for the message board unit 360. A set of wires or conductors 619 may run internally within the conduit 607 from the control unit housing to the message board unit 360, thereby bringing control signals to the message board unit 360 and enabling the operation of the message display. The wires or conductors 619 may optionally also include signals for controlling the LED units 380 which are part of the message board unit 360.

Figure 9:
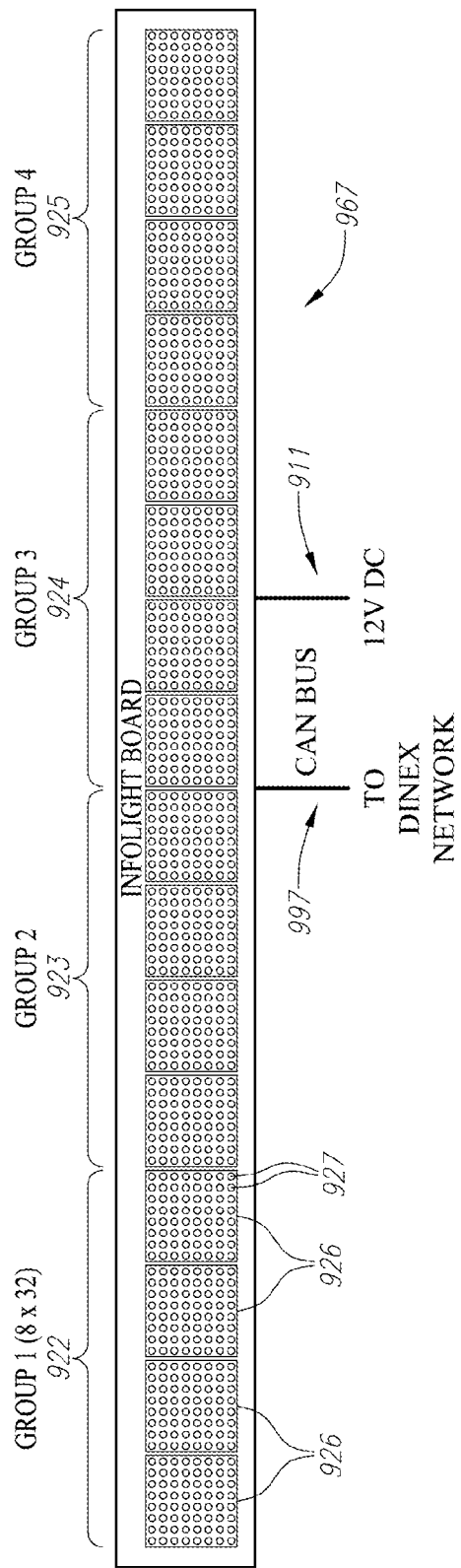
FIG. 9 is a front view diagram of a lighting layout for a message board as may be used in an integrated lighting fixture as disclosed herein.

The message board display 367 itself may comprise any type of informational display including, without limitation, an LED display, liquid crystal display (LCD) screen, or other type of display. The message board display 367 may be monochromatic or multi-colored. An illustration of one possible embodiment of message board display 367 is shown in FIG. 9. The message board display 967 in FIG. 9 is an LED based display unit. As shown in FIG. 9, the message board display 967 may be comprised of multiple groups 922, 923, 924, 925 of LED blocks 926. For example, the first group 922 includes four LED blocks 926. The size of LED blocks 926 may depend upon the particular setting or application; in this example, each LED block 926 comprises an 8×8 square layout of individual LEDs 927. Thus, each group 922, 923, 924, 925 of LED blocks 926 comprises an 8×32 rectangular layout of individual LEDs 927. The LED blocks 926 may comprise standard or conventional off-the-shelf LED modules as are commonly commercially available from various sources. The message board display 967 may be constructed with any number of groups of LED blocks 926, and in some cases the LED blocks need not be arranged in groups. In other embodiments, the message board display may form a singular M×N array of LEDs.

The message board display 967 is also shown receiving a low voltage power input 911 (such as 12 Volts DC) and a cable (or other set of wires) 997 constituting control lines for controlling the operation of the LEDs or other lighting elements of the message board display 967.

The message board display 967 (or 367) may be controlled by a message board controller which may be integral with the message board unit or else may disposed at a removed or remote location, as previously described with respect to the design of FIGS. 6A and 6B. The message board display 967 (or 367) may, for example, be controlled so as to display messages, advertisements, route information, emergency information, or any other desired information. Where capable, the message board display 367 may also or alternatively display still images or video images, which may be pre-recorded and read from an on-vehicle memory source or else received from a live source, through a wireless receiver for example that interacts with the message board controller.

Figure 7:
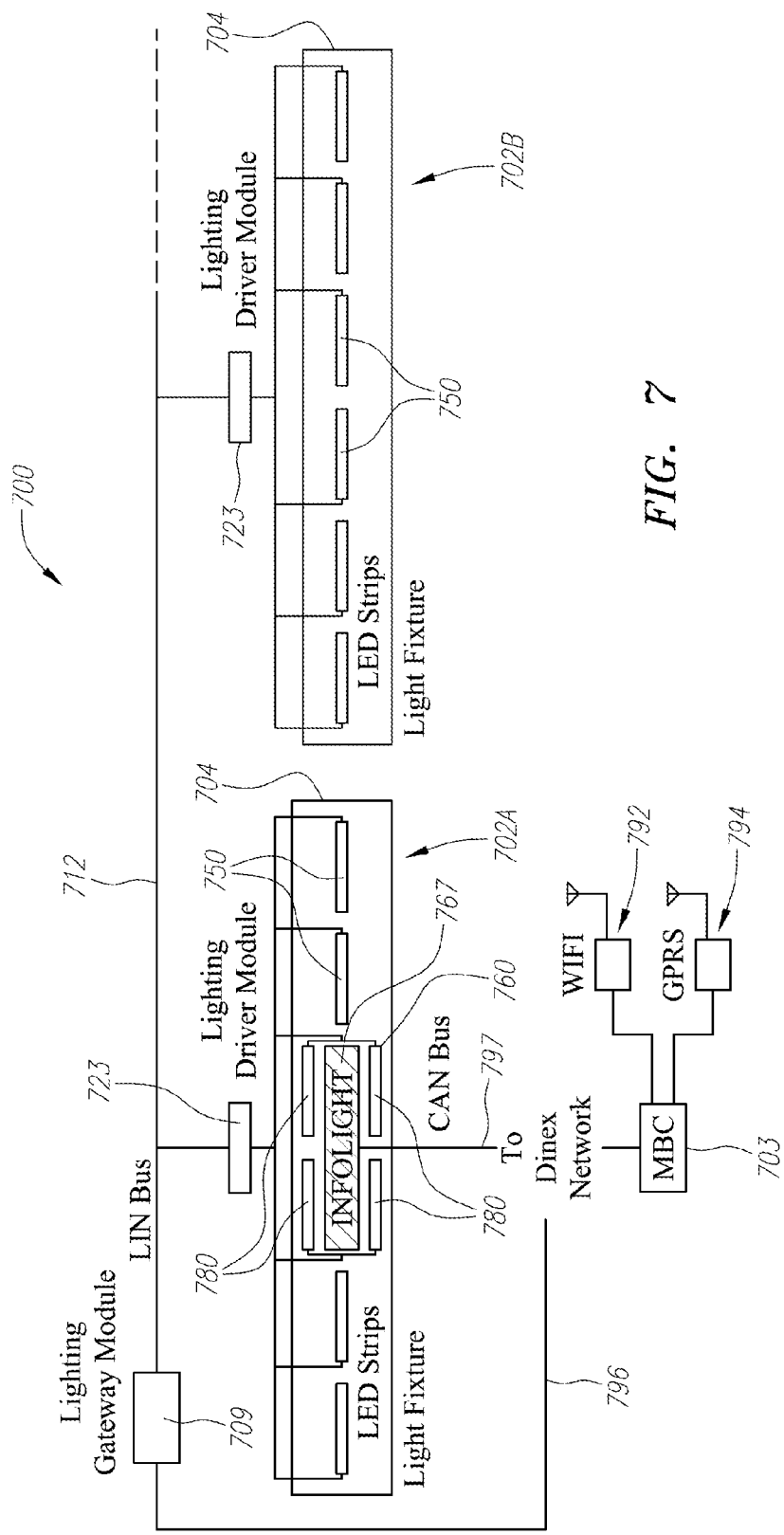
FIG. 7 is a system diagram of a control network architecture and associated lighting fixtures in accordance with one embodiment as disclosed herein.

FIG. 7 is a system diagram of a control network architecture and associated lighting fixtures, including at least one message board lighting fixture, in accordance with one embodiment as disclosed herein. As shown in FIG. 7, a master control unit (MBC) 703 controls a number of functions within the system, and connects directly or indirectly to various standard lighting fixtures such as 702B (meaning in this case that they do not have a message display board) and message board lighting fixtures such as 702A within the vehicle or other area being illuminated. The master control unit 703 may, in this example, provide control signals over a first bus 796 to a lighting gateway module 709, which converts or translates the control signals over a lighting control bus 712 to both the standard lighting fixtures 702B as well as to the lighting illumination portion (such as LED units) of the message board lighting fixture(s) 702A. The master control unit 703 may also provide control signals over a second bus 797 to the control electronics of the message board unit(s) 760 affixed to the message board lighting fixture(s) 702A.

Each of the standard lighting fixtures 702B and message board lighting fixtures 702A may include a lighting driver module 723 that interfaces with the lighting gateway module 709, for receiving and distributing lighting control commands to the various LED units 750 of the standard lighting fixtures 702B and message board lighting fixtures 702A via bus 712. The first bus 712 may, for example, take the form of a LIN bus or other type of bus, possibly through a lighting gateway module 709 which may provide data translation as between different parts of the network. The second bus 797 may, for example, take the form of a CAN bus or other type of bus. In this example, the lighting driver module 723 for the first lighting fixture 702A controls both the primary LED units 750 for illumination as well as the LED units 780 that may, in certain embodiments, be attached to the frame of the message board unit 760. The message board display 767 of the message board unit 767 may, as noted, have separate control electronics responsive to the master control unit 703.

The master control unit 703 may be part of or connected to the larger vehicle control system or, if in a different setting, part of a building or other control network, for example. The master control unit may be coupled to a general packet radio service (GPRS) transceiver 794 and/or a wireless network transceiver 792 to allow communication to various wireless endpoints, to facilitate operations or diagnostics, or for other purposes.

Figure 8:
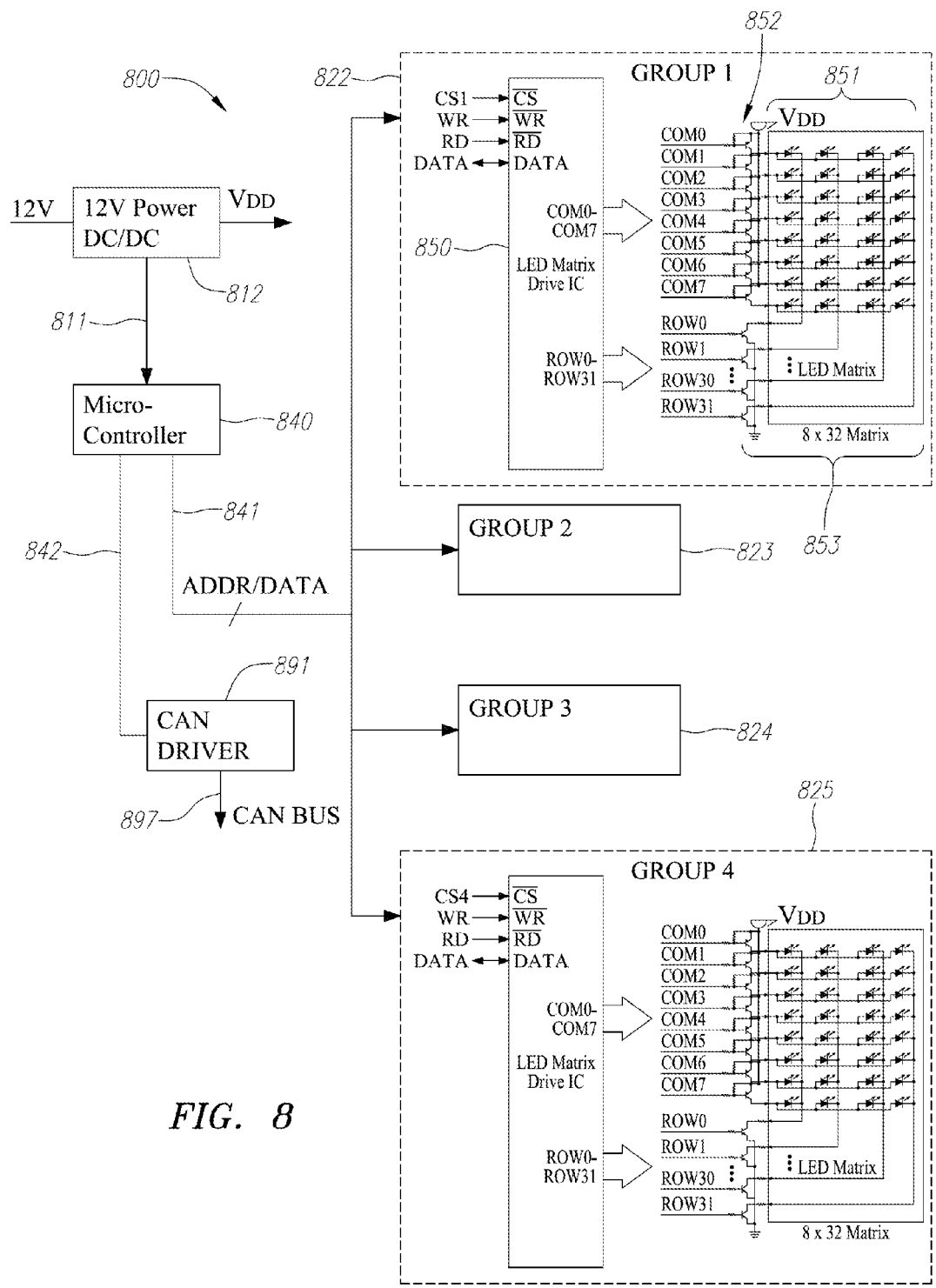
FIG. 8 is a block diagram of electrical components for controlling and operating a message board portion of an integrated lighting fixture, in accordance with an example of one embodiment.

FIG. 8 is a block diagram of electrical components for controlling and operating, among other things, a message board portion of an integrated lighting fixture, in accordance with an example of one embodiment as disclosed herein. As shown in FIG. 8, a local message board controller 840 (which may take the form of any suitable microprocessor, microcontroller, controller, or digital circuitry) controls the operation of a plurality of LED blocks 822, 823, 824, 825, which may be generally analogous to the LED blocks 922, 923, 924 and 925 illustrated in FIG. 9. The local message board controller 840 in this example may interact with a remote controller (not shown), such as a master control unit, over a control data bus 842 which, if desired, can be connected to a CAN bus 897 or other bus via a CAN driver (or gateway) 891. The CAN driver 891 in this case connects to the CAN bus 897 which is coupled to a master control unit (similar to master control unit 703 in FIG. 7). The local message board controller 840 may draw power from a power regulator 812 or other power source, which may also provide power for the LED units 822, 823, 824, 825.

The local message board controller 840 preferably controls the display of text, images or other display information on the message board portion of an integrated lighting fixture, in response to commands received from a remote source such as a remote master unit. To this end, the local message board controller 840 may translate display commands and provide suitable instructions and/or data to the LED blocks 822, 823, 824, 824 in order to display text, images, or other display information on the message board. Each of the LED blocks 822, 823, 824, 825 preferably includes an LED module driver 850 coupled to an LED display array 853 comprising a two-dimensional grid of individual LEDs 851. The LED module driver 850 provides output signals to the LED display array 853 in response to display commands received from the local message board controller 840. The local message board controller 840 may comprise volatile memory (such as RAM) apportioned into, e.g., separate queues or data structures for each of the LED blocks 822, 823, 824, 825.

In alternative embodiments, the local message board controller 840 may comprise or be associated with a video processor, and the LED blocks 822, 823, 824, 825 may be replaced by a video display, which may be for example an LCD or LED video display.

Figure 14:
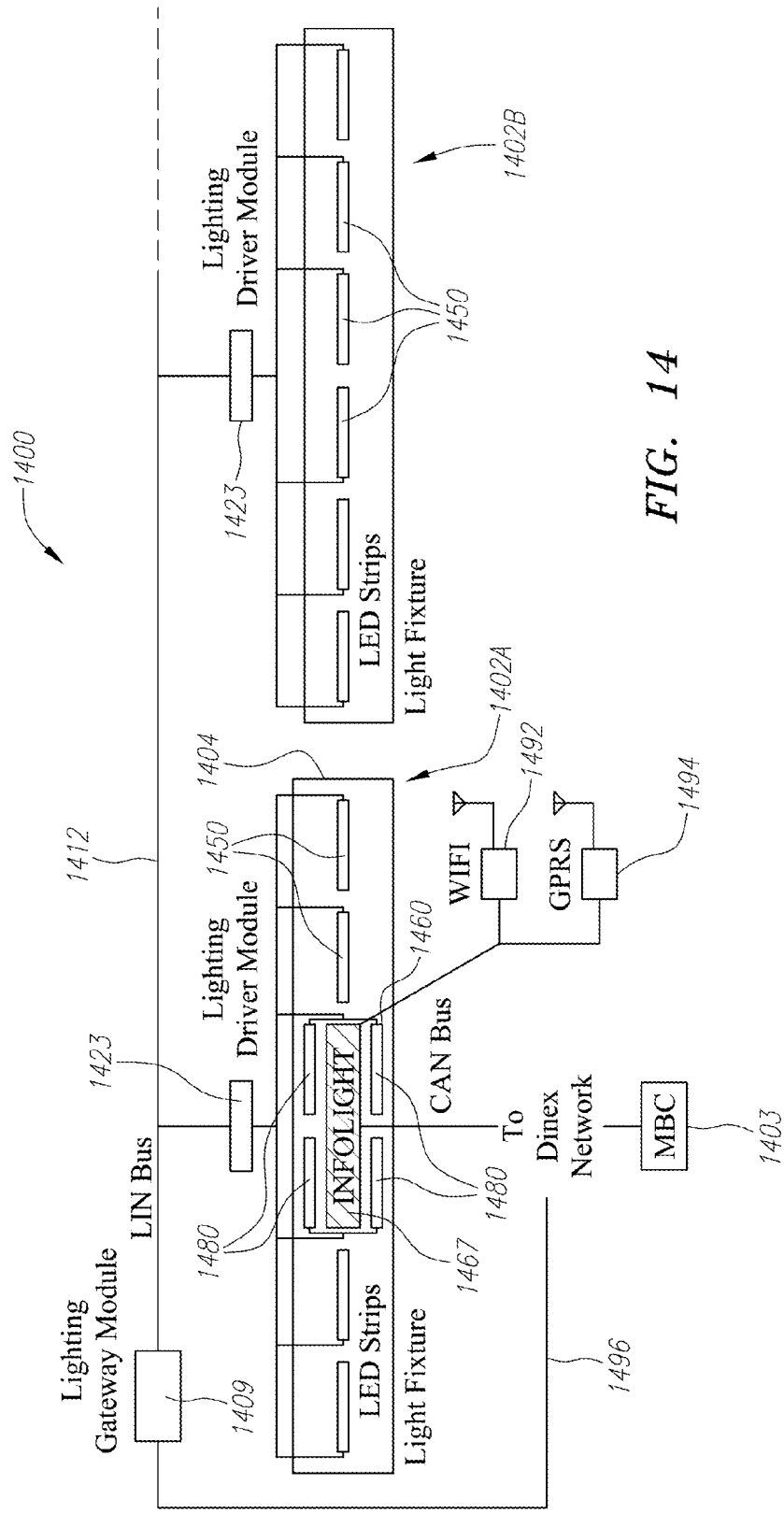
FIG. 14 is a system diagram of a control network architecture and associated lighting fixtures in accordance with another embodiment as disclosed herein.
Figure 15:
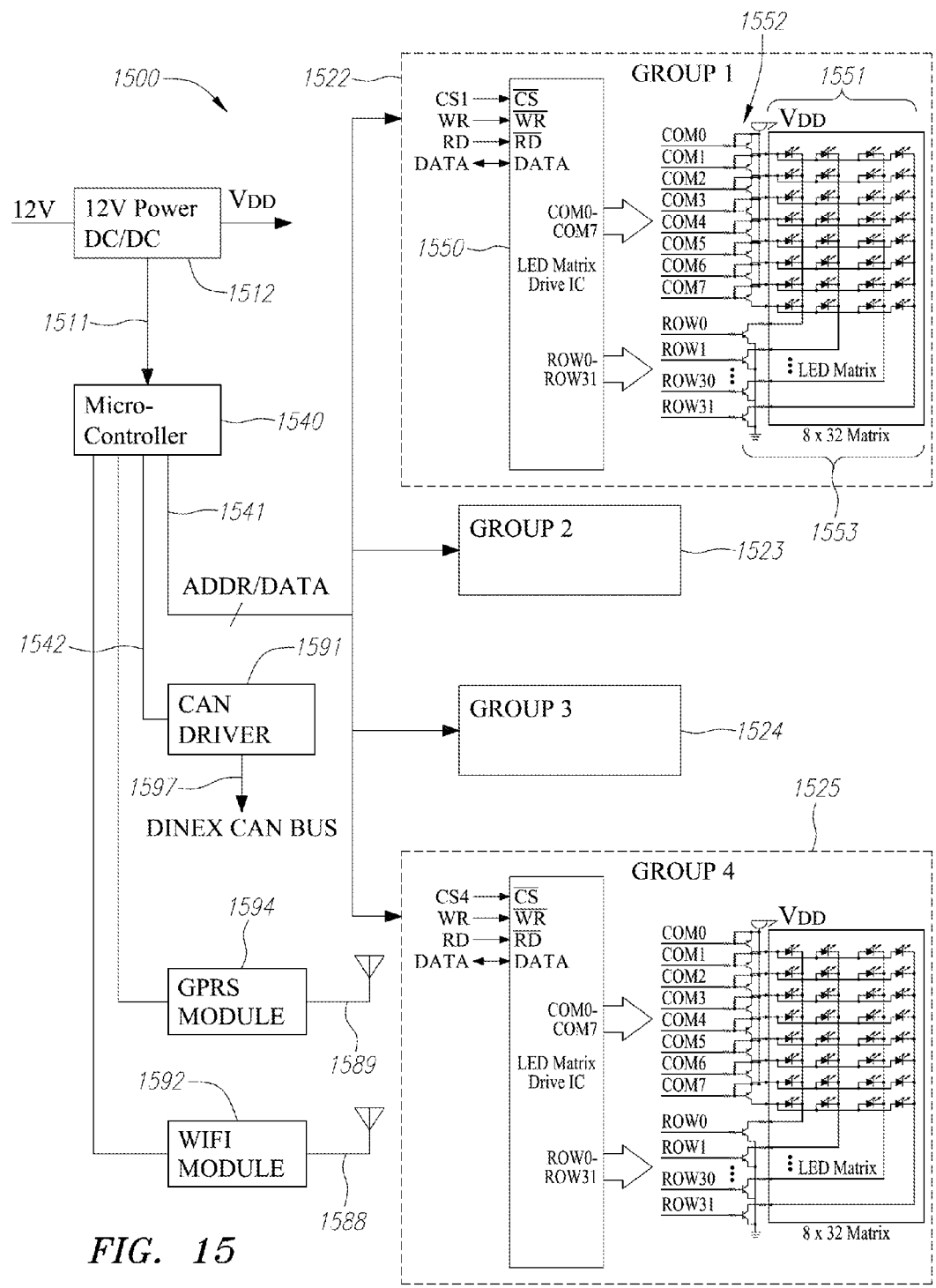
FIG. 15 is a block diagram of electrical components for controlling and operating a message board of an integrated lighting fixture, in accordance with another embodiment as disclosed herein.

FIGS. 14 and 15 illustrate an alternative control architecture for an integrated message board, according to another embodiment as disclosed herein. FIG. 14 is a system diagram of a control network architecture and associated lighting fixtures, similar to FIG. 7, including an integrated message board 1402A and a standard lighting fixture 1402B. In FIG. 14, elements labeled "14xx" generally correspond to the analogous elements labeled "7xx" in FIG. 7. A difference here is that the GPRS transceiver 1494 and/or the wireless transceiver 1492 may be connected directly to the electronic display unit 1460, as opposed to the master control unit 1403. This way, the electronic display unit FIG. 15 is a block diagram of electrical components for controlling and operating a message board of an integrated lighting fixture, as may be used with the embodiment of FIG. 14. In FIG. 15, elements labeled "15xx" generally correspond to the analogous elements labeled "8xx" in FIG. 8. The main difference between the embodiments in FIG. 8 and FIG. 15 is that in the latter, a GPRS transceiver 1594 and/or a wireless module 1592 are coupled to the local message board controller 1540, such that the local message board controller 1540 may be directly controlled by wireless command signals received from remote sources via the GPRS transceiver 1594 and/or a wireless module 1592. In this case, control of the electronic display unit may bypass, for instance, a master control unit that otherwise controls the greater vehicle or other network.

Figure 10A:
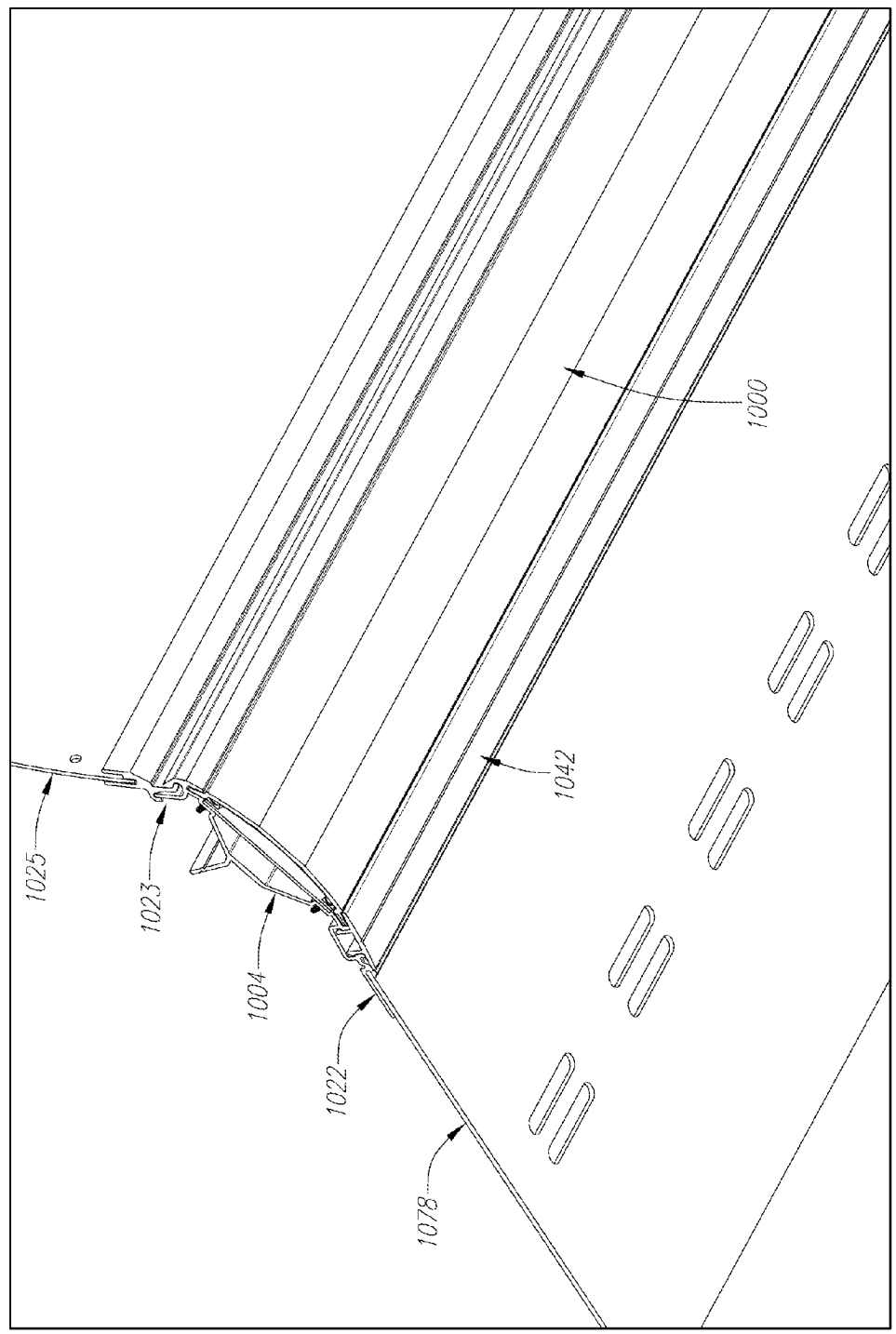
FIGS. 10A and 10B are oblique view diagrams of a message board lighting fixture in accordance with another embodiment as disclosed herein, as may be used for example in a transit vehicle or other setting.
Figure 10B:
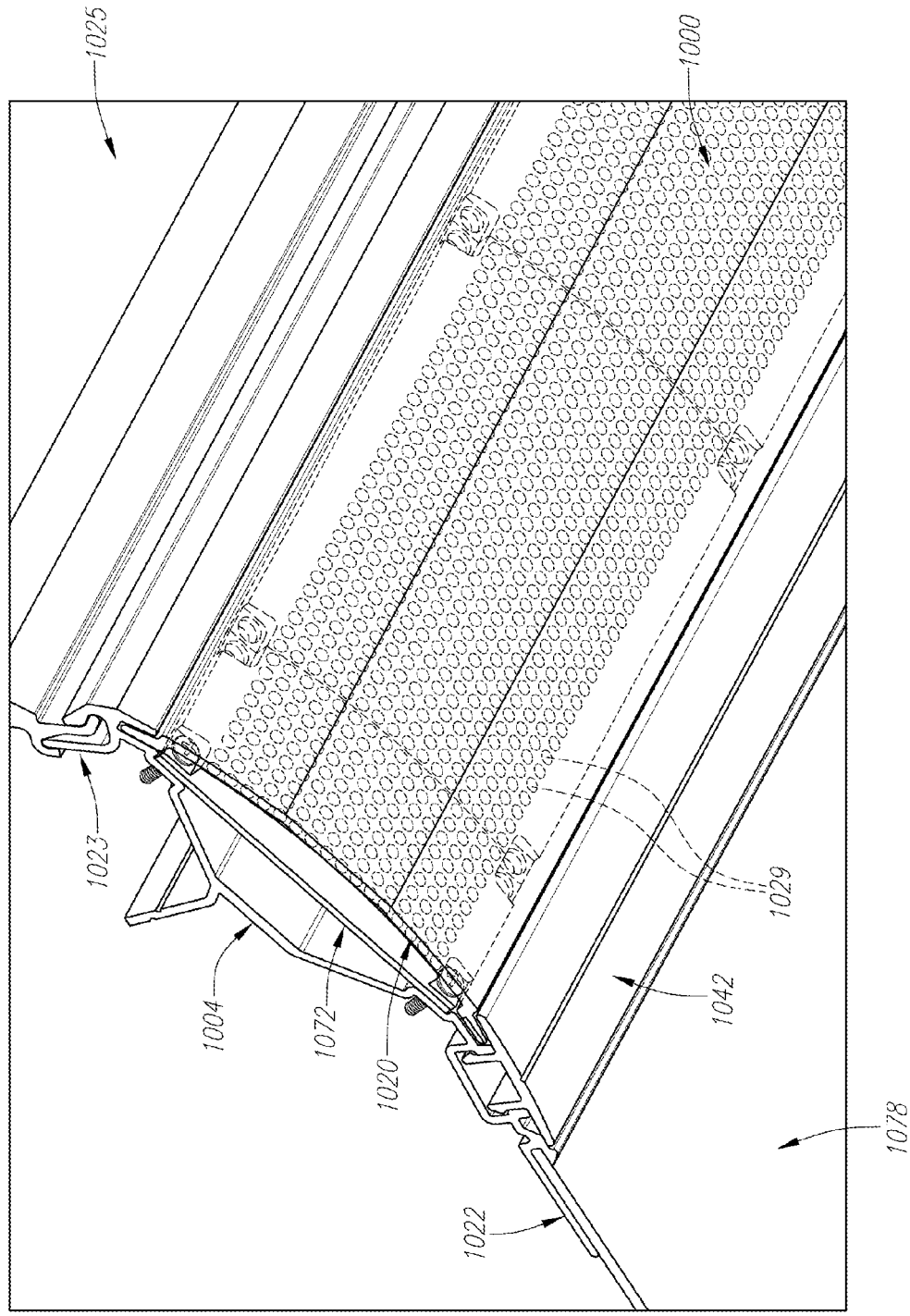
Figure 11A:
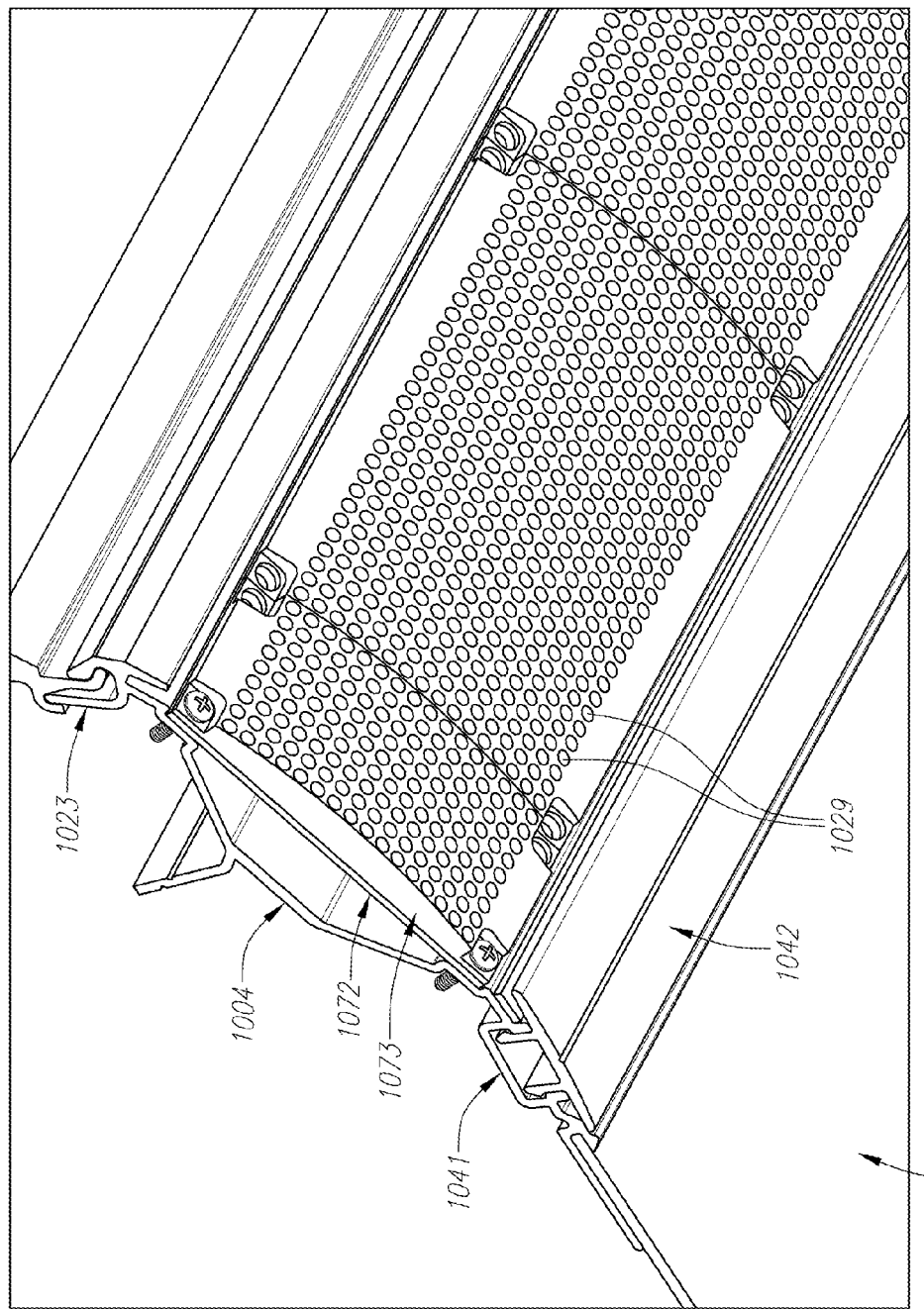
FIGS. 11A and 11B are oblique view diagrams illustrating certain components that may be used in the message board lighting fixture of FIGS. 10A-10C.
Figure 11B:
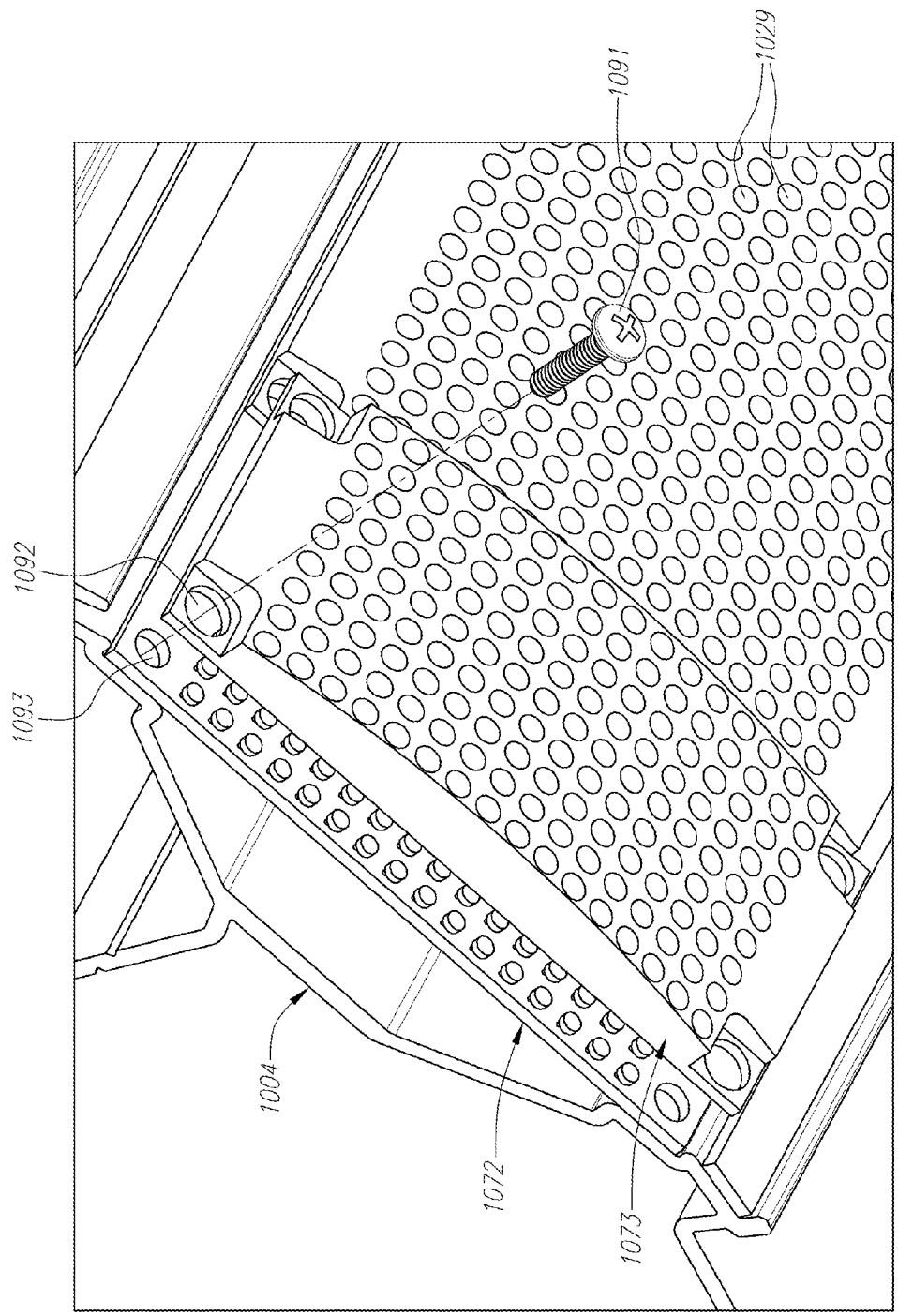

Further details of another embodiment of a message board lighting fixture are illustrated from various viewpoints in FIGS. 10A-10C, 11A-11B, 12A-12C. FIGS. 10A and 10B are oblique view diagrams of the message board lighting fixture 1000 in accordance with this embodiment, as may be used for example in a transit vehicle or other setting, and FIG. 10C is a side view diagram of the message board lighting fixture 1000. FIGS. 11A and 11B are oblique view diagrams illustrating certain components that may be used in the message board lighting fixture 1000 of FIGS. 10A-10C, while FIGS. 12A, 12B and 12C are side view diagrams illustrating certain components that may be used in the message board lighting fixture 1000.

The message board lighting fixture 1000 in this example may, unlike the prior example, may comprise a full array of LEDs 1027 spanning the length of the entire lighting fixture. The LEDs 1027 in this case may be selectively employed to provide either illumination or display text, messages, images, or other information. The message board lighting fixture 1000 may have multiple operating modes, including a daylight mode and a nighttime mode. In the daylight mode, the background may be black (LEDs off), and words, text, or images may intermittently be displayed as desired. In nighttime mode, the background may be kept white in order to provide ambient illumination. The number of LEDs 1027 in this embodiment may vary, but the LEDs 1027 are preferably arranged in a two-dimensional grid spanning the entire length of the lighting fixture, and there may be, for example, 16 LEDs per column and a number of columns dependent upon the width of the lighting fixture. The LEDs may be relatively low power, such as $\frac{1}{8}$ or $\frac{1}{16}$ Watt each. The controller for the message board lighting fixture 1000 may be similar to that shown in FIG. 8 or 15, but with additional LED blocks sufficient to cover the desired length, which may be the complete length of the lighting fixture. In one aspect, the LEDs 1027 of the message board lighting fixture 1000 may act as a pixelated display.

As shown now in more detail in the above-referenced figures, a full-display message board lighting fixture 1000 may be adapted for placement in a transit vehicle, disposed between a ceiling panel 1078 and a riser panel 1025. The ceiling panel 1078 would generally be positioned over a seating area in a transit vehicle, and may abut the interior sidewall of the transit vehicle. The riser panel 1025 is, in this particular example, curved in approximately a quarter arc shape, and would generally reach to the ceiling of the transit vehicle or some other top mounting surface. The riser panel 1025 may optionally be configured to allow mounting of advertising prints or similar materials, as is common in the transit industry. The message board lighting fixture 1000 may be adapted to interconnect to the ceiling panel 1078 and the riser panel 1025, for example using a U-shaped receptacle 1023 that mates or attaches to a complementary hook or guidepiece 1024 associated with the riser panel 1025.

A removable light permeable cover 1120 may be provided or affixed to the message board lighting fixture 1000, for softening or evening out the illumination from the LEDs 1027 thereof. A snap-in removable lens holder 1042 may be manually inserted into a receptacle 1041 to secure the light permeable cover 1020, and likewise may be manually removed (e.g., popped out) to allow convenient removal of the light permeable cover 1020.

In one embodiment, the message board lighting fixture 1000 comprises a support frame 1004. A printed circuit board 1072 on which the LEDs 1027 reside may be attached to the support frame 1004 with screws 1091, for example, as illustrated more clearly in FIGS. 11A and 11B, or by any other suitable means. In a preferred embodiment, an LED light guide 1073 is disposed over the LEDs 1027, having a plurality of tube-shaped or cylindrical holes as illustrated in FIG. 12B corresponding to the physical locations of the LEDs 1027. The tubes or holes may act as individual lightguides to more sharply focus the light of the LEDs 1027, thereby resulting in an effect which makes the LED array appear as a pixelated display, i.e., a display having a number of individual pixels 1029 (see FIGS. 10B and 11B). Without the LED light guide 1073, the illumination from the different LEDs 1027 would likely bleed together, making it difficult to use the LED array as an electronic display for messages, text, images, etc. As shown in FIGS. 12A-12C, for example, the LED light guide 1073 preferably has a curved outer surface, such that the light permeable cover 1020 rests on or near it in a substantially flush manner, as illustrated in FIG. 12C. The LED light guide 1073 may be attached to the support frame 1004 using the same screws 1091 (or other means) as are utilized to hold the printed circuit board to the support frame 1004 and may, for example, be made of molded plastic or PVC.

The support frame 1004 may be constructed using aluminum extrusion, which may operate as a heat sink in addition to providing physical support for the LEDs 1027. The support frame 1004 may optionally be configured with metallic heat dissipating fins on the backside of one or more of its walls. The riser panel 1025 may be constructed of a lightweight durable material such as fiberglass, or PVC plastic. Ceiling panel 1022 is preferably formed of a composite material, such as two metal layers sandwiching an insulator material. The length of the message board lighting fixture 1000 may vary depending upon lighting or display needs, and the use of LEDs provides flexibility in terms of fixture lengths and sizes. In one particular example, the message board lighting fixture 1000 is approximately 60" in length. The control module for the message board lighting fixture 1000 may be contained in a control module housing (not shown) on the backside of the support frame 1004. Multiple message board lighting fixtures 1000 may optionally be connected using cables, in a daisy chain fashion or otherwise, to create longer displays.

Figure 13A:
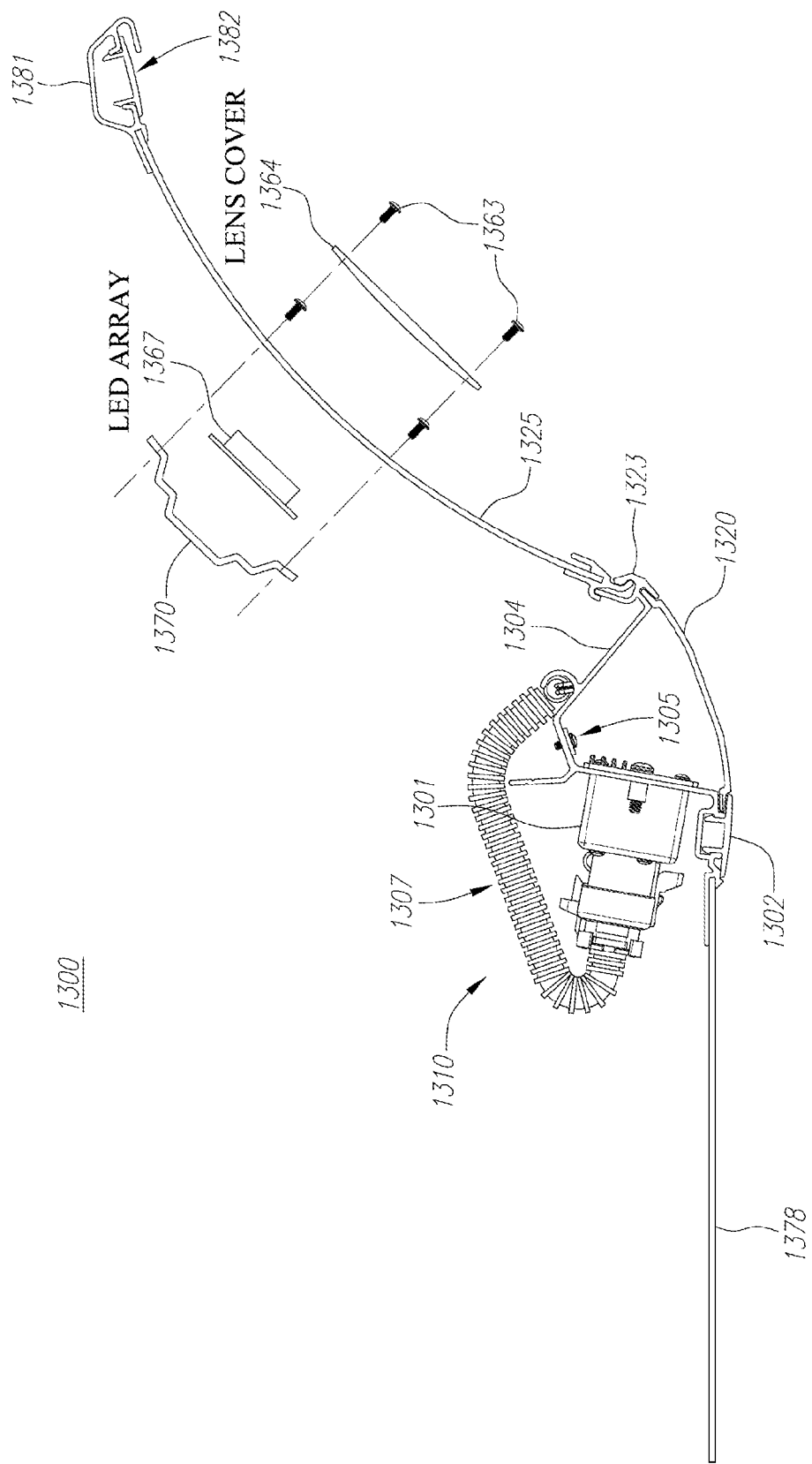
Figure 13B:
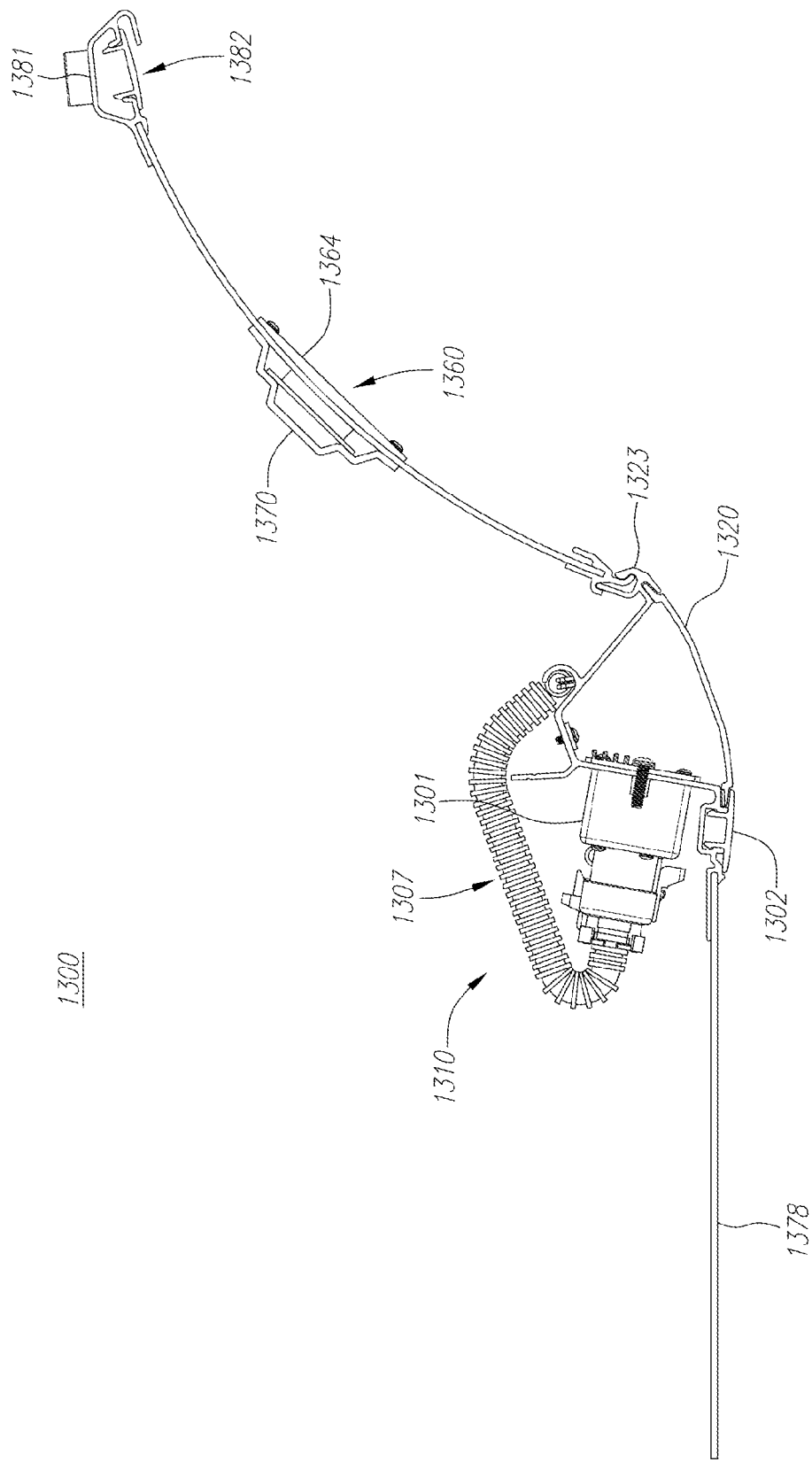
Figure 13C:
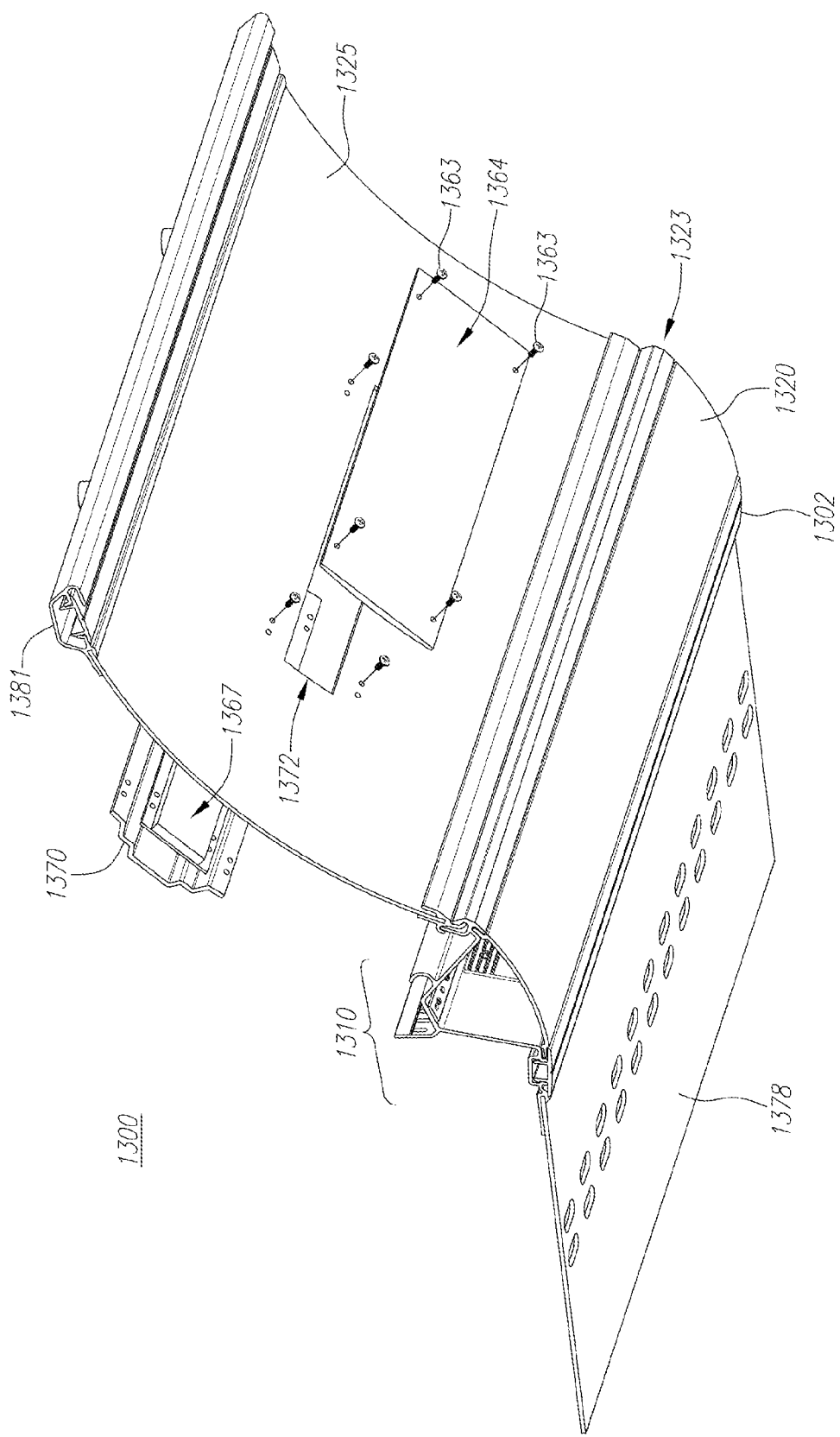
FIGS. 13C and 13D are oblique view diagrams of the same embodiment.
Figure 13D:
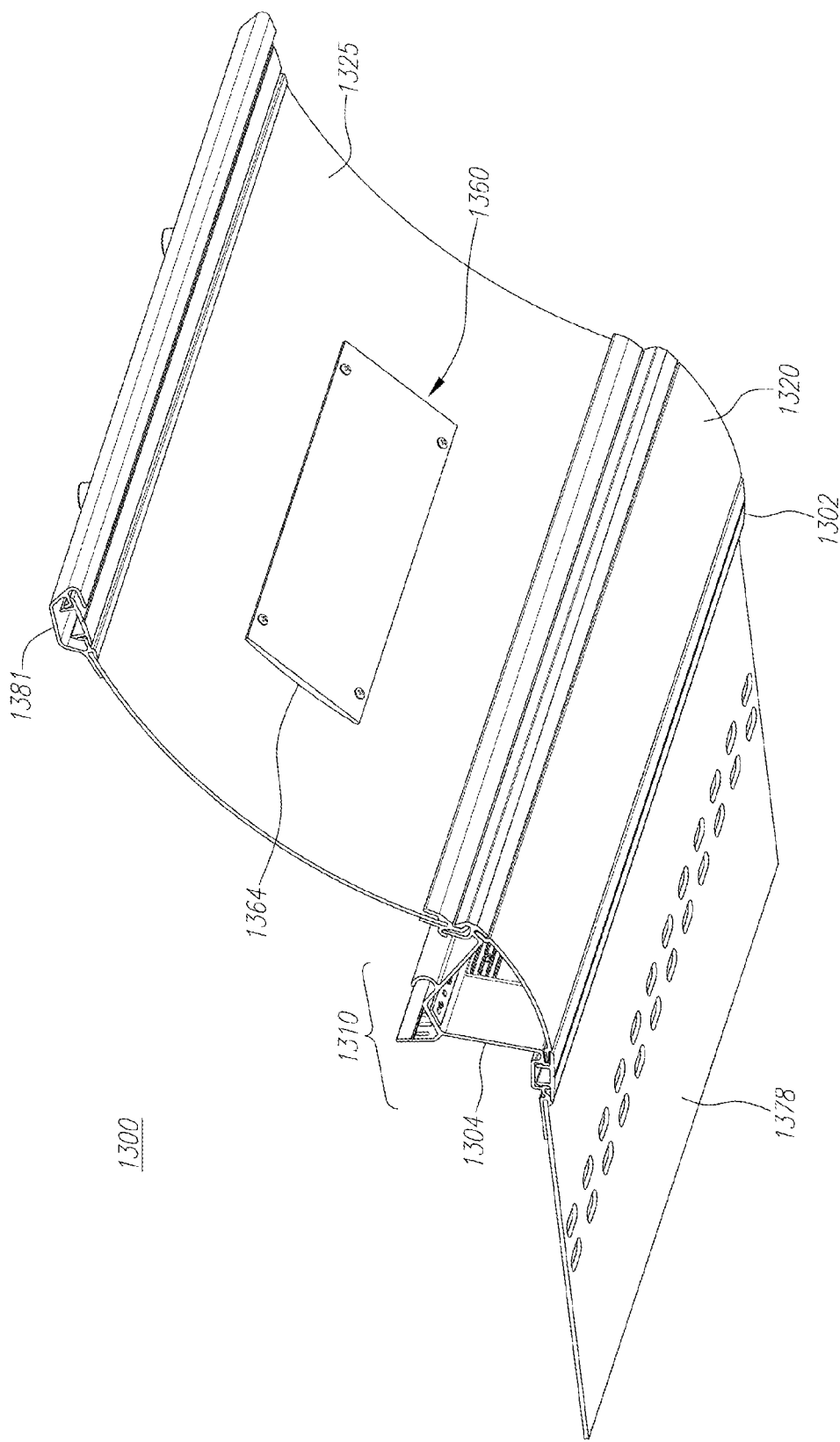

FIGS. 13A and 13B are side view diagrams illustrating another embodiment of a message board lighting fixture as disclosed herein, while FIGS. 13C and 13D are oblique view diagrams of the same embodiment. In the embodiment of FIGS. 13A-13D, an electronic display unit 1360 is associated with a semiconductor based lighting fixture 1310, but does not reside on the fixture frame of the lighting fixture 1310. In FIGS. 13A-13D, the nature of the construction of the ceiling panel 1378, riser panel 1325, and fixture 1310 is similar to the way in which similar elements are constructed and assembled in FIGS. 10A-10C, 11A-11B, and 12A-12C. However, in this example, rather than an electronic display board residing between the riser panel 1325 and the ceiling panel 1378, the electronic display unit 1360 is disposed in a cutout section 1372 of the riser panel 1325, as illustrated in FIG. 13C.

In this example, the lighting fixture 1310 is preferably a fixture using semiconductor-based lighting elements, and may be embodied for example as a lighting fixture of the type(s) disclosed in U.S. Pat. No. 8,319,433, assigned to the assignee of the present invention, and incorporated by reference as if set forth fully herein. The lighting fixture 1310 may have LED units 1305 or individual LEDs mounted along a backwall of a fixture frame 1304, and a control unit 1301 that receives wires or cabling through an insulated protector 1307. As before, a light permeable lens cover 1320 may be disposed over the lighting fixture 1310, and secured thereto using a removable lens holder 1302. The riser panel 1325 itself may attach to a U-shaped receptacle 1323 associated with the lighting fixture 1310, and to the ceiling or other surface of a transit or similar vehicle.

The electronic display unit 1360 may include a display board 1367 comprising a circuit board with a plurality of LED blocks mounted thereon, similar to the message board display unit 367 previously discussed in connection with FIG. 3. A back housing 1370 may be used to clamp the display board 1367 into place, with, e.g., screws 1363 being used to attach a light permeable lens cover 1364 (which is preferably a transparent or clear cover) to the riser panel 1325 and back housing 1370. The lighting fixture 1310 and electronic display unit 1360 may be independently controlled, as previously described in relation to FIG. 3 and other embodiments described herein, although they may optionally be controlled by the same remote master control unit. As before, the electronic display unit 1360 may optionally be coupled to a GPRS and/or wireless transceiver, and may be controlled directly through wireless commands. The electronic display unit 1360 may, under control of various commands, display text, messages, images, etc., or in some cases video if having sufficient pixel density.

In various embodiments as disclosed herein, the electronic display unit may store text, message, images or other display information locally, in a durable memory, or else may receive data for display from a remote source, including a remote wireless (e.g., RF) source. In addition or alternative to other embodiments disclosed herein, the electronic display unit may utilize laser images displayed on the back of the cover lens in order to display text, messages, images or other information.

The control network architecture for the various embodiments of the LED-based lighting fixtures and electronic display units described herein may utilize, for example, control networks disclosed or described in one or more of U.S. Pat. Nos. 5,907,496, 6,061,600, 6,094,416, 6,147,967, 6,201,995, 6,611,860, 6,961,306, 7,046,621, 7,046,622, and/or 7,065,039, all of which are assigned to the assignee of the present invention and hereby incorporated by reference as if set forth fully herein.

In various embodiments, an integrated LED-based lighting fixture and message board constructed in accordance with the principles and techniques disclosed herein may exhibit a number of advantages and/or useful characteristics. For example, the lighting system and its various components may have a long lifetime, because LEDs generally have a long useful life. As a result, fewer lighting fixtures require replacement over time, as compared to, e.g., fluorescent lighting fixtures, which may reduce maintenance costs (both replacement component costs and service costs). LEDs consume less current than fluorescent lights, typically using about half the power, thus resulting in a significant power savings. Using LEDs may reduce the effects of electromagnetic coupling, and also reduce arcing because the LEDs typically operate off a 12 or 24 Volt supply.

As another potential advantage, LEDs have no filaments or bulbs, and are highly durable. LEDs are generally resistant to vibration, cold, dampness, and salt spray, providing many environmental settings in which the lighting systems disclosed herein may be utilized. An LED-based lighting network may also be more environmentally friendly, as compared with fluorescent, incandescent and neon lighting, in that their construction requires less fossil fuels (required to produce the glass needed to encapsulate incandescent, fluorescent and neon lighting), and potentially environmentally harmful materials (such as Mercury) or gases (such as neon) need not be used in the manufacture of LEDs.

Another advantage of the LED-based lighting systems as disclosed herein is that the LED and/or message board fixtures may be made any desired length, by, for example, altering the number of LEDs in the array. By contrast, fluorescent lights generally are available in only certain preset sizes, limiting flexibility. Different sized LED-based fixtures may be mixed and matched within a transit vehicle, offering great flexibility in physical layout and arrangement.

While preferred embodiments of the invention have been described herein, many variations are possible which remain within the concept and scope of the invention. Such variations would become clear to one of ordinary skill in the art after inspection of the specification and the drawings. The invention therefore is not to be restricted except within the spirit and scope of any appended claims.

What is claimed is:

1. A lighting fixture display unit, comprising:
   a fixture frame having a backwall;
   a plurality of semiconductor-based lighting elements disposed on or attached to the fixture frame for providing area illumination;
   an electronic display disposed on or attached to the fixture frame; and
   a lens cover disposed on the fixture frame, enclosing the semiconductor-based light elements and electronic display beneath it, wherein at least some of said semiconductor-based light elements are disposed in elongate linear arrays oriented horizontally and extending laterally from each end of the electronic display and between the lens cover and the backwall.

2. The lighting fixture display unit of claim 1, wherein the backwall supports at least some of said semiconductor-based lighting elements, and a pair of sidewalls tapering towards an opening wider than said backwall, wherein said lens attaches to the fixture frame proximate said opening.

3. The lighting fixture display unit of claim 2, wherein the electronic display comprises a message board support frame mounted to said fixture frame, and an electronic display board mounted on the message board support frame.

4. The lighting fixture display unit of claim 3, wherein the message board support frame is disposed on the backwall of the fixture frame approximately centrally along a lengthwise dimension of the fixture frame, and wherein at least some of said semiconductor-based light elements are disposed on either side of the message board support frame.

5. The lighting fixture display unit of claim 4, wherein said message board support frame comprises a base support affixed to the backwall of the fixture frame, and a pair of message board frame sidewalls tapering outwards to form a frame opening, and wherein the electronic display board is attached to the message board support frame proximate said frame opening.

6. The lighting fixture display unit of claim 5, further comprising a second plurality of semiconductor-based light elements disposed on said message board frame sidewalls.

7. The lighting fixture display unit of claim 6, wherein said second plurality of semiconductor-based light elements are oriented to direct light towards the fixture frame sidewalls whereby their light is reflected in part towards the lens cover.

8. The lighting fixture display unit of claim 6, wherein said second plurality of semiconductor-based light elements are not visible when the lens cover is attached to said fixture frame and said lighting fixture display unit is installed in a fixed location.

9. The lighting fixture display unit of claim 1, wherein said electronic display comprises a plurality of LED blocks each comprising a two-dimensional array of light-emitting diodes.

10. The lighting fixture display unit of claim 9, wherein said LED blocks include light-emitting diodes of different colors.

11. The lighting fixture display unit of claim 1, wherein said electronic display comprises a liquid crystal display screen.

12. The lighting fixture display unit of claim 1, further comprising a local lighting controller responsive to lighting commands provided over a network from a remote control source, and wherein said electronic display comprises a local message board controller responsive to message board control signals provided over said network.

13. The lighting fixture display unit of claim 1, wherein said fixture frame is configured for mounting in a transit vehicle.

14. An integrated lighting fixture display unit for a transit vehicle, comprising:
    a concave fixture frame having a reflective interior cavity;
    a plurality of semiconductor-based lighting elements disposed on or attached to the fixture frame and within the reflective interior cavity for providing area illumination for an interior space within the transit vehicle;
    an electronic display unit disposed on or attached to the fixture frame; and
    a detachable lens cover attachable to the fixture frame, wherein at least some of said semiconductor-based light elements are disposed in elongate linear arrays oriented horizontally and extending laterally from each end of the electronic display unit.

15. The integrated lighting fixture display unit of claim 14, wherein the fixture frame includes a backwall, and wherein at least some of the semiconductor-based lighting elements are disposed in a linear pattern upon said backwall.

16. The integrated lighting fixture display unit of claim 15, wherein the electronic display unit is disposed on the backwall of said fixture frame and is mounted substantially centrally within the reflective interior cavity thereof.

17. The integrated lighting fixture display unit of claim 14, wherein the electronic display unit comprises a support member affixed to the backwall of said fixture frame, and a hollow projecting frame section for suspending an electronic display within the reflective interior cavity.

18. The integrated lighting fixture display unit of claim 17, wherein the hollow projecting frame section is augmented with a second plurality of semiconductor based lighting elements directed towards the reflective interior cavity for providing backlighting.

19. The integrated lighting fixture display unit of claim 14, wherein the detachable lens cover has a diffusive portion over said semiconductor-based lighting elements and a separate transparent region over an area encompassing the electronic display unit.

20. The integrated lighting fixture display unit of claim 14, wherein the fixture frame has a backwall and a pair of sidewalls tapering towards an opening wider than said backwall, wherein said detachable lens cover attaches to the fixture frame proximate said opening.

21. The integrated lighting fixture display unit of claim 14, wherein said electronic display unit comprises a plurality of LED blocks each comprising a two-dimensional array of light-emitting diodes.

22. The integrated lighting fixture display unit of claim 21, wherein said LED blocks include light-emitting diodes of different colors.

23. The integrated lighting fixture display unit of claim 14, wherein said electronic display unit comprises a liquid crystal display screen.

24. The integrated lighting fixture display unit of claim 14, further comprising a local lighting controller responsive to lighting commands provided over a network from a remote control source, and wherein said electronic display unit comprises a local message board controller responsive to message board control signals provided over said network for displaying content on a display of said electronic display unit.

25. An integrated lighting fixture display unit for a transit vehicle, comprising:
   a fixture frame having an elongate cavity defined by a first sidewall and a second sidewall each spanning a length of the cavity, and a backwall attached to the first and second sidewalls;
   a plurality of semiconductor-based lighting elements disposed on or attached to the backwall of the fixture frame and within the elongate cavity for providing area illumination for an interior space within the transit vehicle;
   an electronic display disposed on or attached to the fixture frame within the elongate cavity, said electronic display visible to occupants when the lighting fixture is mounted within the transit vehicle; and
   a detachable lens cover disposed on the fixture frame and being at least partially diffusive, said lens cover enclosing the semiconductor-based light elements and electronic display beneath it, wherein at least some of said semiconductor-based light elements are disposed in elongate linear arrays oriented horizontally and extending laterally from each end of the electronic display.

* * * * *